(12) United States Patent
Hwang

(10) Patent No.: US 9,317,244 B2
(45) Date of Patent: *Apr. 19, 2016

(54) MOBILE TERMINAL

(71) Applicant: LG ELECTRONICS INC., Seoul (KR)

(72) Inventor: Keumsung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 164 days.

This patent is subject to a terminal disclaimer.

(21) Appl. No.: 14/050,190

(22) Filed: Oct. 9, 2013

(65) Prior Publication Data

US 2014/0104141 A1    Apr. 17, 2014

(30) Foreign Application Priority Data

Oct. 15, 2012  (KR) .......................... 10-2012-0113966

(51) Int. Cl.
*G06F 3/14* (2006.01)

(52) U.S. Cl.
CPC ............ *G06F 3/1423* (2013.01); *G06F 3/1454* (2013.01)

(58) Field of Classification Search
CPC ...... H04M 1/7253; G06F 3/14; G06F 3/1423; G06F 3/1431
See application file for complete search history.

(56) References Cited

U.S. PATENT DOCUMENTS

| | | | | |
|---|---|---|---|---|
| 2003/0013417 | A1* | 1/2003 | Bum | 455/90 |
| 2004/0044774 | A1* | 3/2004 | Mangalik | H04L 67/2819 709/227 |
| 2010/0167646 | A1* | 7/2010 | Alameh | G06F 3/017 455/41.2 |
| 2010/0234073 | A1* | 9/2010 | Kusano | 455/566 |
| 2012/0136529 | A1* | 5/2012 | Curtis | G01C 21/20 701/32.2 |
| 2012/0218421 | A1* | 8/2012 | Chien | F21V 19/00 348/207.1 |
| 2013/0278484 | A1* | 10/2013 | Hwang et al. | 345/2.3 |
| 2015/0206151 | A1* | 7/2015 | Carney | A61B 5/0002 705/304 |

* cited by examiner

*Primary Examiner* — Ricardo L Osorio
(74) *Attorney, Agent, or Firm* — Lee, Hong, Degerman, Kang & Waimey

(57) ABSTRACT

A mobile terminal capable of performing a content sharing function with an external display device includes an output unit configured to include a display module and an audio output module, a radio communication unit configured to perform a wireless communication function with the display device, a sensing unit configured to sense a movement of the mobile terminal, and a controller configured to activate the content sharing function with the display device for a second application when the sensing unit senses a movement of a first type of the mobile terminal in a state in which the content sharing function with the display device for a first application has been activated.

17 Claims, 23 Drawing Sheets

MOBILE TERMINAL

CROSS-REFERENCE TO RELATED APPLICATIONS

Pursuant to 35 U.S.C. §119(a), this application claims the benefit of earlier filing date and right of priority to Korean Patent Application No. 10-2012-0113966 filed on Oct. 15, 2012, the contents of which are hereby incorporated by reference herein in its entirety.

BACKGROUND

1. Field

The present invention relates to a mobile terminal and, more particularly, to a mobile terminal capable of performing a content sharing function with external electronic devices.

2. Related Art

As the functions of a mobile terminal, such as a notebook, a mobile phone, and a smart phone, are diversified, the mobile terminal is being implemented in the form of a multimedia player equipped with complex functions, such as taking a photograph or capturing a moving image, playing music or a moving image file, playing a game, and receiving broadcasting.

In order to support and enhance the functions of the mobile terminal, the improvement of structural parts and/or software parts of the mobile terminal may be taken into consideration. As a variety of terminals including a mobile terminal are recently providing complex and various functions, a menu structure becomes complicated. In particular, researches on a mobile terminal for supporting a content sharing function (as a representative example, an N screen function) with external electronic devices and the release of the mobile terminal for supporting the content sharing function are increasing rapidly.

SUMMARY

An object of the present invention is to provide a mobile terminal capable of changing an application, that is, the object of a content sharing function with another electronic device, based on a simple and intuitive manipulation.

Another object of the present invention is to provide a mobile terminal capable of sharing data with other electronic devices based on a simple and intuitive manipulation in the state in which the content sharing function with another electronic device has been activated.

Yet another object of the present invention is to provide a mobile terminal capable of executing another application or another function independently from a content sharing function in the state in which the content sharing function has been activated.

Technical objects to be achieved by the present invention are not limited to the above-described objects and other technical objects that have not been described will be evidently understood by those skilled in the art from the following description.

A mobile terminal according to an aspect of the present invention can operate with an external display device based on a content sharing function. The mobile terminal includes an output unit configured to include a display module and an audio output module, a radio communication unit configured to perform a wireless communication function with the display device, a sensing unit configured to sense a movement of the mobile terminal, and a controller configured to activate the content sharing function with the display device for a second application when the sensing unit senses a movement of a first type of the mobile terminal in the state in which the content sharing function with the display device for a first application has been activated.

A mobile terminal according to another aspect of the present invention includes a radio communication unit configured to perform a wireless communication function with the display device and the another electronic device, a sensing unit configured to sense a movement of the mobile terminal, and a controller configured to share specific data with the display device and the another electronic device when the sensing unit senses a movement of a first type of the mobile terminal in a state in which the content sharing function for a first application has been activated and display a result of the sharing of the specific data in the display device and a display device of the another electronic device.

A mobile terminal according to yet another aspect of the present invention can perform a content sharing function with an external display device. The mobile terminal includes a radio communication unit configured to perform a wireless communication function with the display device, a sensing unit configured to sense a movement of the mobile terminal, and a controller configured to execute a second application or a predetermined and specific function in the state in which the content sharing function with the display device for a first application has been activated while executing the first application in background, when the sensing unit senses a movement of a first type of the mobile terminal in the state in which the content sharing function with the display device has been activated on the first application being executed in foreground.

DETAILED DESCRIPTION OF THE EMBODIMENTS

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

Figure 1:
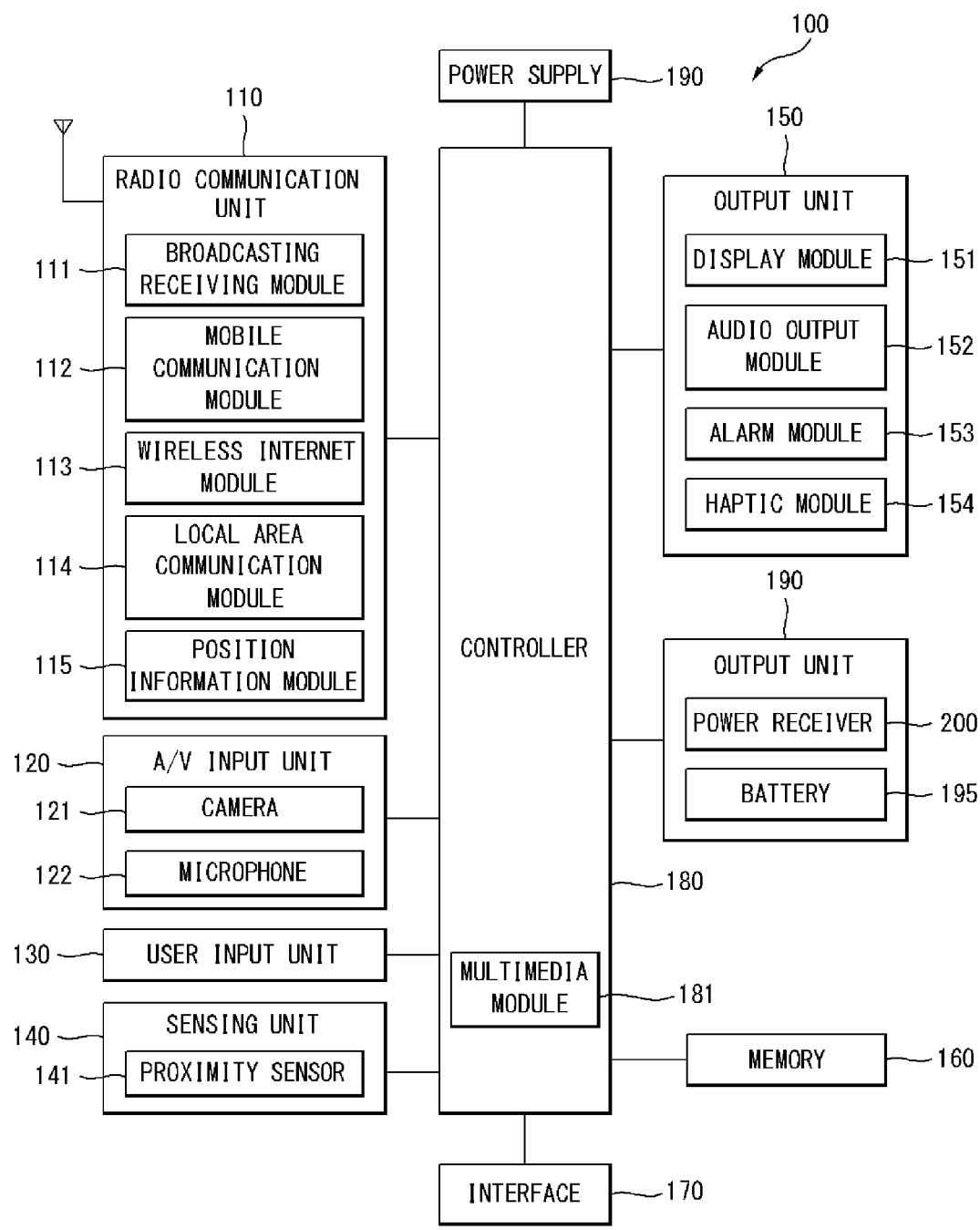
FIG. 1 is a block diagram of a mobile terminal in accordance with an embodiment of the present invention.

FIG. 1 is a block diagram of a mobile terminal 100 in accordance with an embodiment of the present invention. The mobile terminal 100 can include a radio communication unit 110, an audio/video (A/V) input unit 120, a user input unit 130, a sensing unit 140, an output unit 150, memory 160, an interface 170, a controller 180, and a power supply 190. The components shown in FIG. 1 are not essential parts and the number of components included in the mobile terminal can be varied.

The components of the mobile terminal will now be described.

The radio communication unit 110 can include at least one module that enables radio communication between the mobile terminal 100 and a radio communication system or between the mobile terminal 100 and a network in which the mobile terminal 100 is located. For example, the radio communication unit 110 can include a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel.

The broadcasting channel can include a satellite channel and a terrestrial channel. The broadcasting management server can be a server that generates and transmits broadcasting signals and/or broadcasting related information or a server that receives previously created broadcasting signals and/or broadcasting related information and transmits the broadcasting signals and/or broadcasting related information to a terminal. The broadcasting signals can include not only TV broadcasting signals, radio broadcasting signals and data broadcasting signals but also signals in the form of combination of a TV broadcasting signal and a radio broadcasting signal.

The broadcasting related information can be information on a broadcasting channel, a broadcasting program or a broadcasting service provider. The broadcasting related information can be provided even through a mobile communication network. In this case, the broadcasting related information can be received by the mobile communication module 112.

The broadcasting related information can exist in various forms. For example, the broadcasting related information can exist in the form of electronic program guide (EPG) of digital multimedia broadcasting (DMB) or in the form of electronic service guide (ESG) of digital video broadcast-handheld (DVB-H).

The broadcasting receiving module 111 receives broadcasting signals using various broadcasting systems. Particularly, the broadcasting receiving module 111 can receive digital broadcasting signals using digital broadcasting systems such as digital multimedia broadcasting-terrestrial (DMB-T), digital multimedia broadcasting-satellite (DMB-S), media forward link only (MediaFLO), DVB-H and integrated services digital broadcast-terrestrial (ISDB-T) systems. The broadcasting receiving module 111 can be constructed to be suited to broadcasting systems providing broadcasting signals other than the above-described digital broadcasting systems.

The broadcasting signals and/or broadcasting related information received through the broadcasting receiving module 111 can be stored in the memory 160. The mobile communication module 112 transmits/receives a radio signal to/from at least one of a base station, an external terminal and a server on a mobile communication network. The radio signal can include a voice call signal, a video telephony call signal or data in various forms according to transmission and receiving of text/multimedia messages.

The wireless Internet module 113 means a module for wireless Internet access and can be included in the mobile terminal 100 or externally attached to the mobile terminal 100. Wireless LAN (WLAN) (Wi-Fi), wireless broadband (Wibro), world interoperability for microwave access (Wimax), high speed downlink packet access (HSDPA) and so on can be used as a wireless Internet technique.

The local area communication module 114 means a module for local area communication. Bluetooth, radio frequency identification (RFID), infrared data association (IrDA), ultra wideband (UWB) and ZigBee can be used as a local area communication technique.

The position information module 115 confirms or obtains the position of the mobile terminal. A global positioning system (GPS) module is a representative example of the position information module 115. According to the current technology, the GPS module 115 can calculate information on distances between one point (object) and at least three satellites and information on the time when the distance information is measured and apply trigonometry to the obtained distance information to obtain three-dimensional position information on the point (object) according to latitude, longitude and altitude at a predetermined time.

Furthermore, a method of calculating position and time information using three satellites and correcting the calculated position and time information using another satellite is also used. In addition, the GPS module 115 continuously calculates the current position in real time and calculates velocity information using the position information.

Referring to FIG. 1, the A/V input unit 120 is used to input an audio signal or a video signal and can include a camera 121 and a microphone 122. The camera 121 processes image frames of still images or moving images obtained by an image sensor in a video telephony mode or a photographing mode. The processed image frames can be displayed on a display module 151.

The image frames processed by the camera 121 can be stored in the memory 160 or transmitted to an external device through the radio communication unit 110. The mobile terminal 100 can include at least two cameras according to constitution of the terminal.

The microphone 122 receives an external audio signal in a call mode, a recording mode or a speed recognition mode and processes the received audio signal into electric audio data. The audio data can be converted into a form that can be transmitted to a mobile communication base station through the mobile communication module 112 and output in the call mode. The microphone 122 can employ various noise removal algorithms for removing noise generated when an external audio signal is received.

The user input unit 130 receives input data for controlling the operation of the terminal from a user. The user input unit 130 can include a keypad, a dome switch, a touch pad (constant voltage/capacitance), jog wheel, jog switch and so on.

The sensing unit 140 senses the current state of the mobile terminal 100, such as open/close state of the mobile terminal 100, the position of the mobile terminal 100, whether a user touches the mobile terminal 100, the direction of the mobile terminal 100 and acceleration/deceleration of the mobile terminal 100 and generates a sensing signal for controlling the operation of the mobile terminal 100. For example, the sensing unit 140 can sense whether a slide phone is opened or closed when the mobile terminal 100 is the slide phone. And the sensing unit 140 can sense a change of the position of the mobile terminal 100, a movement of the mobile terminal or a gesture of the user using a gesture detecting sensor 141. Furthermore, the sensing unit 140 can sense whether the power supply 190 supplies power and whether the interface 170 is connected to an external device. The sensing unit 140 can include a proximity sensor.

The output unit 150 generates visual, auditory or tactile output and can include the display module 151, an audio output module 152, an alarm module 153 and a haptic module 154.

The display module 151 displays information processed by the mobile terminal 100. For example, the display module 151 displays UI or graphic user interface (GUI) related to a telephone call when the mobile terminal is in the call mode. The display module 151 displays a captured or/and received image, UI or GUI when the mobile terminal 100 is in the video telephony mode or the photographing mode.

The display module 151 can include at least one of a liquid crystal display, a thin film transistor liquid crystal display, an organic light-emitting diode display, a flexible display and a three-dimensional display.

Some of these displays can be of a transparent type or a light transmission type. This can be referred to as a transparent display. The transparent display includes a transparent liquid crystal display. The rear structure of the display module 151 can also be of the light transmission type. According to this structure, a user can see an object located behind the body of the mobile terminal 100 through an area of the body of the mobile terminal 100, which is occupied by the display module 151.

The mobile terminal 100 can include at least two display modules 151 according to constitution of the terminal. For example, the mobile terminal 100 can include a plurality of displays that are arranged on a single face at a predetermined distance or integrated. Otherwise, the plurality of displays can be arranged on different sides.

In the case where the display module 151 and a sensor sensing touch (referred to as a touch sensor hereinafter) form a layered structure, which is referred to as a touch screen hereinafter, the display module 151 can be used as an input device in addition to an output device. The touch sensor can be in the form of a touch film, a touch sheet and a touch pad, for example.

The touch sensor can be constructed such that it converts a variation in pressure applied to a specific portion of the display module 151 or a variation in capacitance generated at a specific portion of the display module 151 into an electric input signal. The touch sensor can be constructed such that it can sense pressure of touch as well as the position and area of touch.

When touch input is applied to the touch sensor, a signal corresponding to the touch input is transmitted to a touch controller. The touch controller processes the signal and transmits data corresponding to the processed signal to the controller 180. Accordingly, the controller 180 can detect a touched portion of the display 151.

The touch sensor may be implemented using proximity sensor located in an internal region of the mobile terminal, surrounded by the touch screen, or near the touch screen. The proximity sensor senses an object approaching a predetermined sensing face or an object located near the proximity sensor using electromagnetic force or infrared rays without having mechanical contact. The proximity sensor has lifetime longer than that of a contact sensor and has wide application.

The proximity sensor includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

A capacitive touch screen is constructed such that proximity of a pointer is detected through a variation in an electric field according to the proximity of the pointer. In this case, the touch screen (touch sensor) can be classified as a proximity sensor.

For convenience of explanation, an action of approaching the pointer to the touch screen while the pointer it not being in contact with the touch screen such that location of the pointer on the touch screen is recognized is referred to as "proximity touch" and an action of bring the pointer into contact with the touch screen is referred to as "contact touch" in the following description. A proximity touch point of the pointer on the touch screen means a point of the touch screen to which the pointer corresponds perpendicularly to the touch screen when the pointer proximity-touches the touch screen.

The proximity sensor senses proximity touch and a proximity touch pattern (for example, a proximity touch distance, a proximity touch direction, a proximity touch velocity, a proximity touch time, a proximity touch position, and a proximity touch moving state). Information corresponding to the sensed proximity touch action and proximity touch pattern can be displayed on the touch screen.

The audio output module 152 can output audio data received from the radio communication unit 110 or stored in the memory 160 in a call signal receiving mode, a telephone call mode or a recording mode, a speech recognition mode and a broadcasting receiving mode. The audio output module 152 outputs audio signals related to functions (for example, a call signal incoming tone, a message incoming tone, etc.) that are performed in the mobile terminal 100. The audio output module 152 can include a receiver, a speaker, a buzzer, etc.

The alarm module 153 outputs a signal for indicating generation of an event of the mobile terminal 100. Examples of events generated in the mobile terminal include receiving of a call signal, receiving of a message, input of a key signal, input of touch, etc. The alarm module 153 can output signals in forms different from video signals or audio signals, for example, a signal for indicating generation of an event through vibration. The video signals or the audio signals can be also output through the display module 151 or the audio output module 152.

The haptic module 154 generates various haptic effects that the user can feel. A representative example of the haptic effects is vibration. The intensity and pattern of vibration generated by the haptic module 154 can be controlled. For example, different vibrations can be combined and output or sequentially output.

The haptic module 154 can generate a variety of haptic effects including an effect of stimulus according to arrangement of pins vertically moving for a contact skin face, an effect of stimulus according to jet force or sucking force of air through a jet hole or a sucking hole, an effect of stimulus rubbing the skin, an effect of stimulus according to contact of an electrode, an effect of stimulus using electrostatic force and an effect according to reproduction of cold and warmth using an element capable of absorbing or radiating heat in addition to vibrations.

The haptic module 154 can not only transmit haptic effects through direct contact but also allow the user to feel haptic effects through kinesthetic sense of his fingers or arms. The mobile terminal 100 can include at least two haptic modules 154 according to a constitution of the mobile terminal.

The memory 160 can store a program for the operation of the controller 180 and temporarily store input/output data (for example, phone book, messages, still images, and moving images). The memory 160 can store data about vibrations and sounds in various patterns, which are output from when a touch input is applied to the touch screen.

The memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can operate in relation to a web storage performing the storing function of the memory 160 on the Internet.

The interface 170 serves as a path to all external devices connected to the mobile terminal 100. The interface 170 receives data from the external devices or power and transmits the data or power to the internal components of the mobile terminal 100 or transmits data of the mobile terminal 100 to the external devices.

The interface 170 can include a wired/wireless headset port, an external charger port, a wired/wireless data port, a memory card port, a port for connecting a device having a user identification module, an audio I/O port, a video I/O port, an earphone port, etc., for example.

An identification module is a chip that stores information for authenticating the authority to use the mobile terminal 100 and can include a user identify module (UIM), a subscriber identify module (SIM) and a universal subscriber identify module (USIM). A device (referred to as an identification device hereinafter) including the identification module can be manufactured in the form of a smart card. Accordingly, the identification device can be connected to the mobile terminal 100 through a card slot included in the interface 170.

The controller 180 controls the overall operation of the mobile terminal. For example, the controller 180 performs control and processing for voice communication, data communication and video telephony. The controller 180 can include a multimedia module 181 for playing multimedia. The multimedia module 181 can be included in the controller 180 or separated from the controller 180.

The controller 180 can perform a pattern recognition process capable of recognizing handwriting input or picture-drawing input applied to the touch screen as characters or images.

The power supply 190 receives external power and internal power and provides power required for the operations of the components of the mobile terminal under the control of the controller 180.

Various embodiments of the inventive concept can be implemented in a computer or similar device readable recording medium using software, hardware or a combination thereof, for example.

According to hardware implementation, the embodiments of the inventive concept can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. In some cases, the embodiments can be implemented by the controller 180.

According to software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

A schematic construction of the mobile terminal 100 according to the present invention has been described above with reference to FIG. 1. A variety of embodiments in which the mobile terminal 100 according to the present invention performs a content sharing function with other electronic devices are described below. For reference, in this specification, content sharing operations between the mobile terminal 100 according to the present invention and other electronic devices and a variety of operations related to the content sharing operations are described by taking an N screen function as an example. It is to be noted that a content sharing function performed by the mobile terminal according to the present invention is not limited to the N screen function. Furthermore, the N screen function is well known to a person having ordinary skill in the art to which the present invention pertains, and thus a detailed description thereof is omitted.

Figure 2:
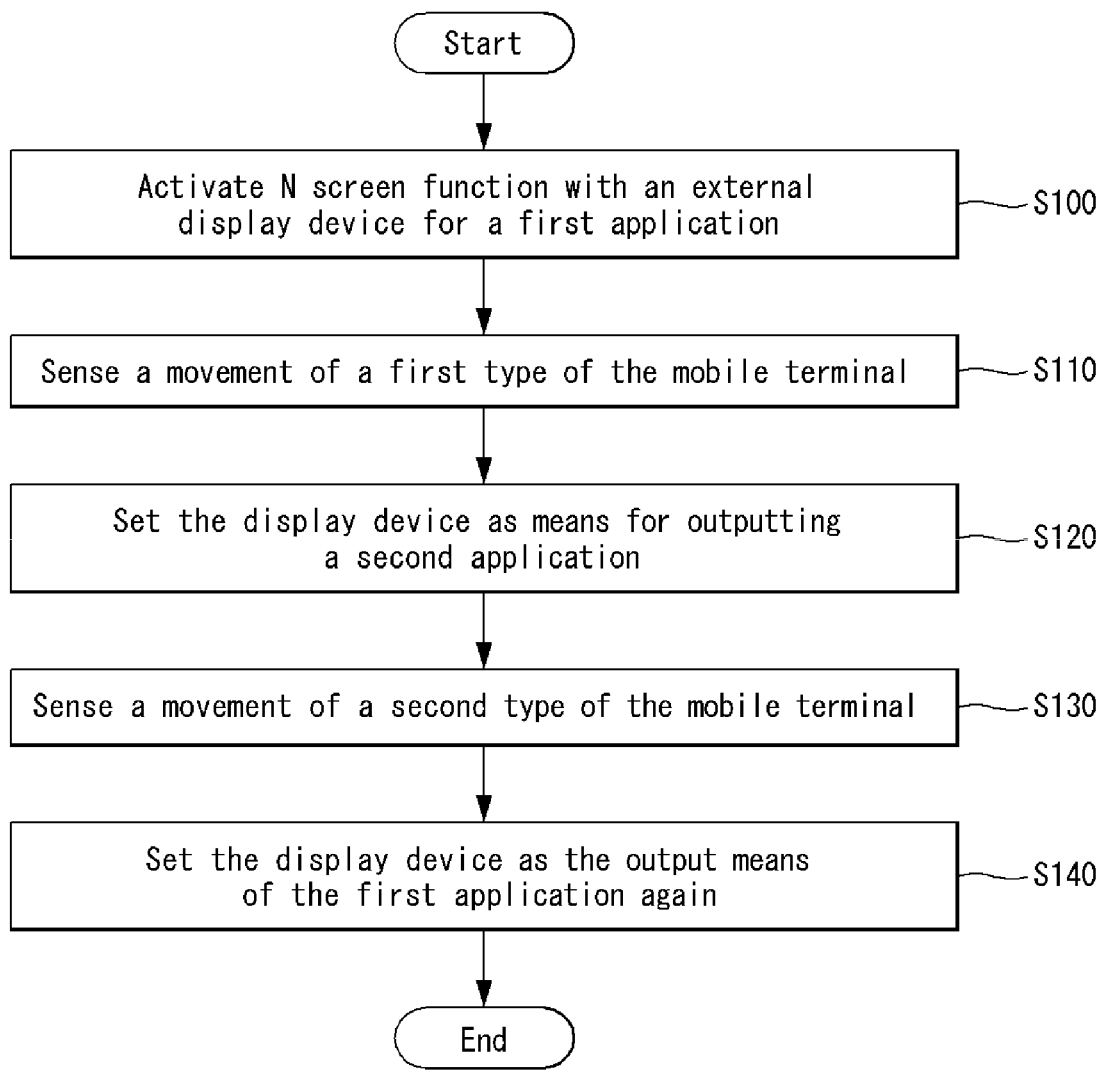
FIG. 2 is a flowchart illustrating an example of the driving method of the mobile terminal according to the present invention.

FIG. 2 is a flowchart illustrating an example of the driving method of the mobile terminal 100 according to the present invention. The driving method of the mobile terminal 100 is described below with reference to necessary drawings.

In the state in which the N screen function with an external display device has been activated on a first application being executed in the mobile terminal 100 at step S100, the sensing unit 140 senses a movement of a first type of the mobile terminal 100 at step S110. In the state in which the N screen function with the display device has been activated, the execution screen of the first application is displayed in the display device. However, the execution screen of the first application may not be displayed in the display module 151 of the mobile terminal 100.

When the movement of the first type of the mobile terminal 100 is sensed, the controller 180 of the mobile terminal 100 sets the display device as means for outputting a second application at step S110. That is, the execution screen of the second application is displayed in the display means of the display device, and an audio signal according to the execution of the second application is outputted to the audio output means of the display device. This may mean that the display device has been set as means for executing the N screen function (i.e., content sharing means) for the second application. In this specification, the meaning that the display device has been set as means for outputting a specific application being executed in the mobile terminal 100, as described above, may mean that the display device has been set as means for executing the N screen function (i.e., content sharing means) for the specific application.

At this time, the execution screen of the second application may not be displayed in the display module 151 of the mobile terminal 100. For example, the execution screen of the first application may be displayed in the display module 151 of the mobile terminal 100 and/or a user interface related to the second application may be displayed in the display module 151 of the mobile terminal 100. It is however to be noted that the scope of the present invention is not limited to the above example.

Meanwhile, the second application may be another application being executed in the mobile terminal 100. That is, when a movement of a first type of the mobile terminal 100 is sensed, the mobile terminal 100 according to the present invention can set the display device as output means corresponding to another application that is being subject to multi-tasking.

Furthermore, the second application can be an application that is newly executed in the mobile terminal 100 in response to the movement of the first type of the mobile terminal 100. In response to the movement of the first type of the mobile terminal 100, the second application executed in the mobile terminal 100 might have been previously set or may be changed by a user.

In the state in which the display device has been set as the output means of the second application, the sensing unit 140 senses a movement of a second type of the mobile terminal 100 at step S130. In response to the sensing, the controller 180 sets the display device as the output means of the first application again at step S140. This means that the display device is set as the means for executing the N screen function for the first application.

Unlike in the example of FIG. 2, the first application may be an application being executed in the display device or an application being executed in another electronic device connected to the display device. In some embodiments, the first application may be an application that has been previously determined to be executed in the mobile terminal 100 in response to a movement of a first type of the mobile terminal 100.

Figure 3:
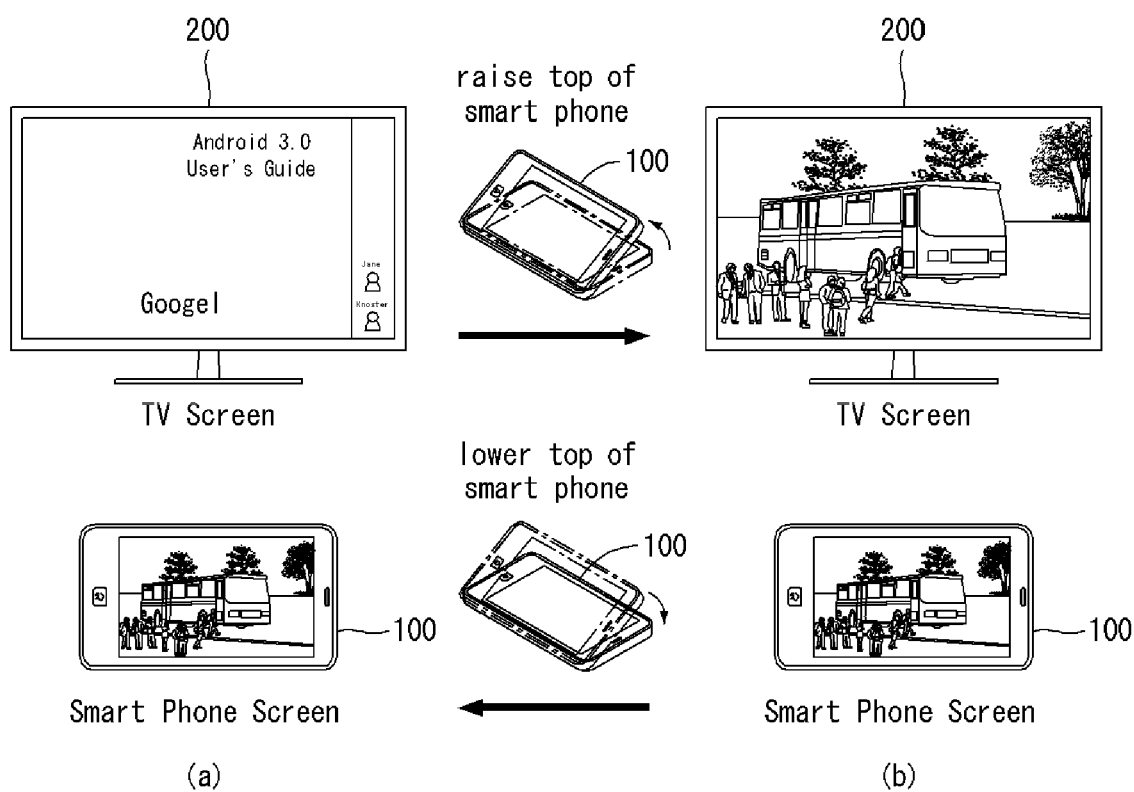
FIG. 3 shows an example in which the screen of an external display device operating in conjunction with the mobile terminal is controlled in the state in which an N screen function has been activated in accordance with the driving method of the mobile terminal shown in FIG. 2.

FIG. 3 shows an example in which the screen of an external display device (e.g., TV) 200 operating in conjunction with the mobile terminal (e.g., a smart phone) 100 is controlled in the state in which the N screen function has been activated in accordance with the driving method of the mobile terminal 100 shown in FIG. 2.

FIG. 3(*a*) shows that the execution screen of a document application is displayed in the TV 200, that is, a display device connected to the smart phone 100, and that the execution screen of a moving image application is displayed in the smart phone 100 in the state in which the N screen function has been activated.

In the state of FIG. 3(*a*), a user raises the top of the smart phone 100. In response thereto, the controller 180 of the smart phone 100 controls the smart phone 100 and the TV 200 so that the execution screen of the moving image application is displayed in the TV 200 as shown in FIG. 3(*b*). That is, FIG. 3 shows an example in which the movement of the first type of the mobile terminal 100 described with reference to FIG. 2 corresponds to a movement in which the top of the mobile terminal 100 is lifted up.

Unlike in the example of FIG. 3(b), when the movement in which the top of the smart phone 100 is lifted up is sensed, the execution screen of the moving image application may not be displayed in the smart phone 100. For example, a user interface for controlling the operation of the moving image application or the execution screen of the document application being displayed through the TV 200 may be displayed in the smart phone 100.

When a user takes down the raised top of the smart phone 100 in the state of FIG. 3(b), the controller 180 may control the TV 200 so that the execution screen of the document application is displayed in the TV 200. That is, FIG. 3 shows an example in which the movement of the second type of the mobile terminal described with reference to FIG. 2 corresponds to a movement in which the raised top of the mobile terminal 100 is lowered again. Meanwhile, if the document application is an application being executed in the smart phone 100, the controller 180 must control the smart phone 100 together with the TV 200.

Figure 4:
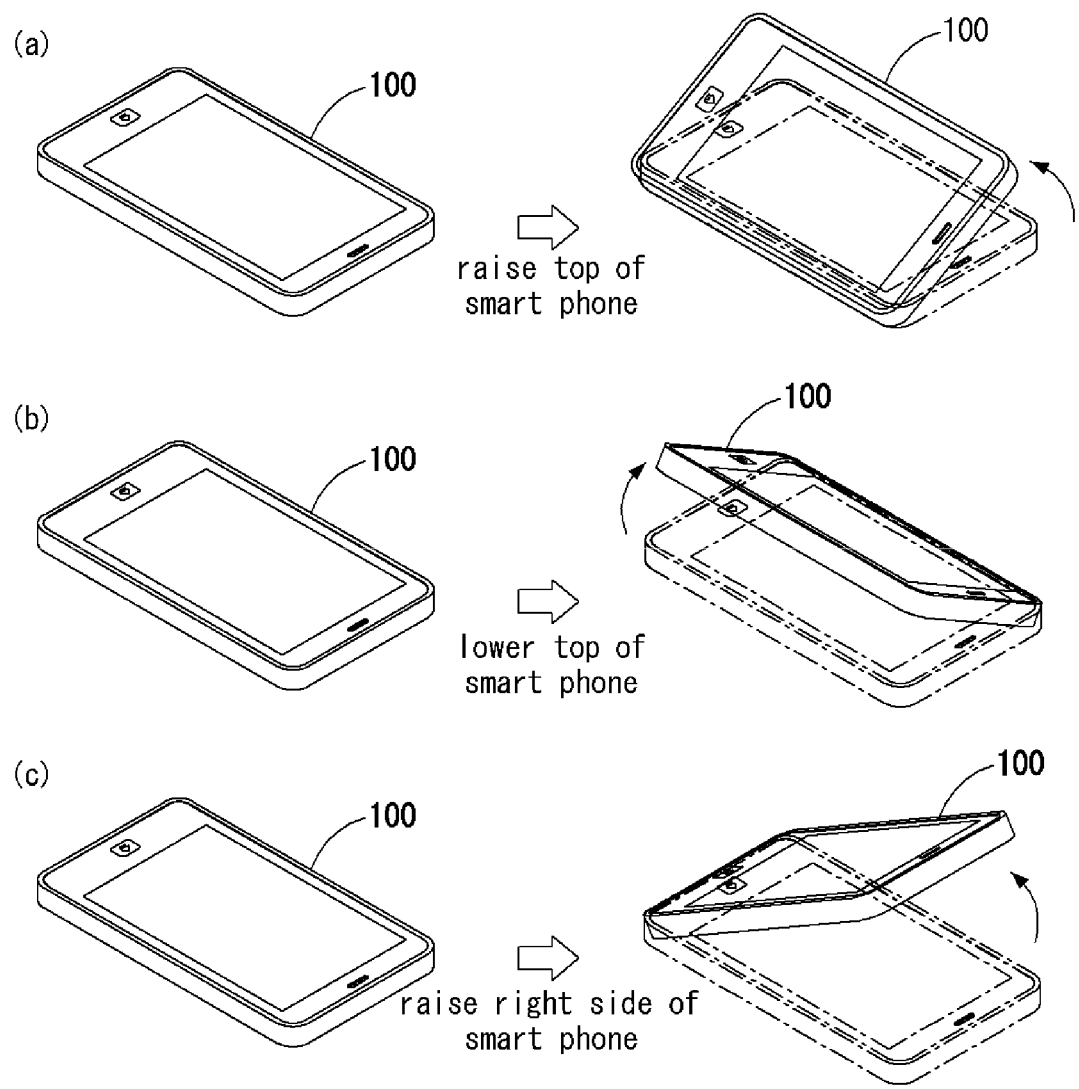
FIG. 4 shows examples of movements of the first type of the mobile terminal for controlling the output state of an external display device which operates in conjunction with the mobile terminal in accordance with the driving method of the mobile terminal shown in FIG. 2.

FIG. 4 shows examples of movements of the first type of the mobile terminal 100 for controlling the output state of an external display device 200 which operates in conjunction with the mobile terminal 100 in accordance with the driving method of the mobile terminal 100 shown in FIG. 2.

FIG. 4(a) shows an example in which the movement of the first type of the mobile terminal 100 is a movement in which the top of the mobile terminal 100 is lifted up, as described above with reference to FIG. 3. The movement of the second type of the mobile terminal 100 corresponding to the movement of the first type of the mobile terminal 100 can be a movement in which the raised top of the mobile terminal 100 is taken down again, as described with reference to FIG. 3.

FIG. 4(b) shows an example in which the movement of the first type of the mobile terminal 100 is a movement in which the bottom of the mobile terminal 100 is lifted up. The movement of the second type of the mobile terminal 100 corresponding to the movement of the first type of the mobile terminal 100 can be a movement in which the raised bottom of the mobile terminal 100 is taken down again.

FIG. 4(c) shows an example in which the movement of the first type of the mobile terminal 100 is a movement in which the right side of the mobile terminal 100 is lifted up. The movement of the second type of the mobile terminal 100 corresponding to the movement of the first type of the mobile terminal 100 can be a movement in which the right side of the mobile terminal 100 is taken down again.

The movements of the first type of the mobile terminal 100 shown in FIG. 4 are only examples according to an implementation method of the present invention, and the scope of the present invention is not limited to the examples.

Figure 5:
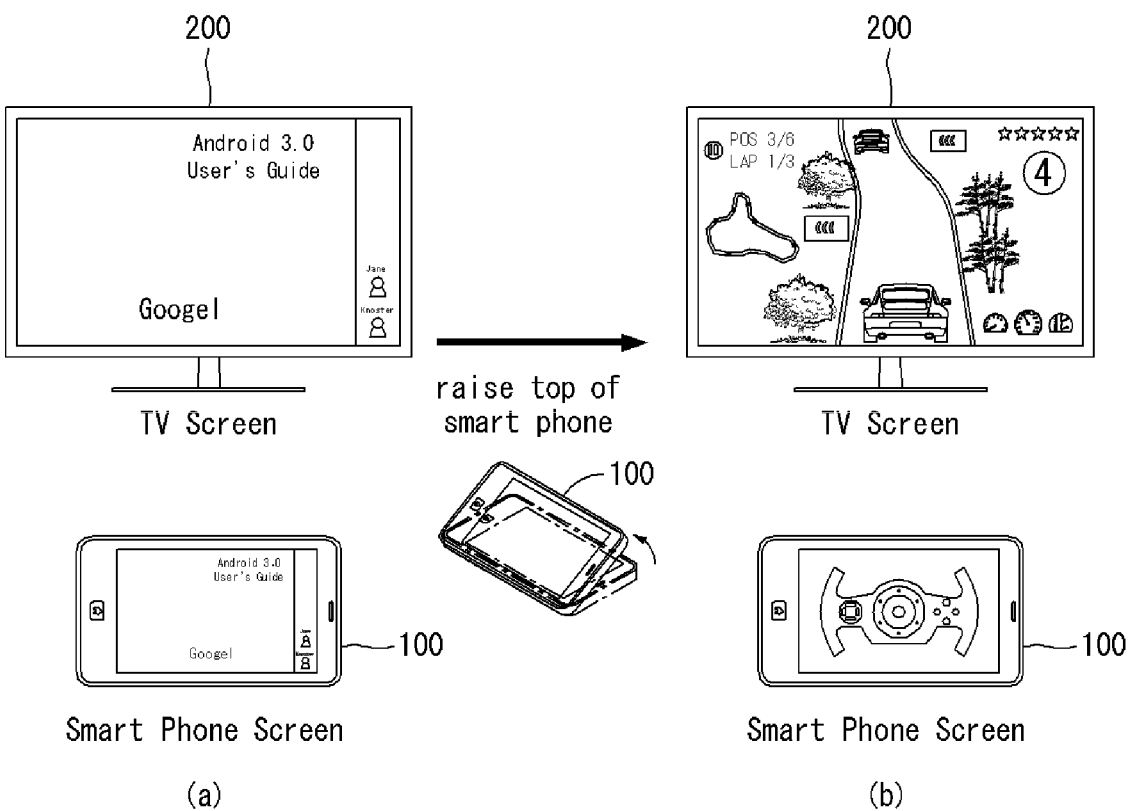
FIG. 5 shows another example in which the screen of an external display device operating in conjunction with the mobile terminal is controlled in the state in which the N screen function has been activated in accordance with the driving method of the mobile terminal shown in FIG. 2.

FIG. 5 shows another example in which the screen of an external display device (e.g., TV) 200 operating in conjunction with the mobile terminal (e.g., a smart phone) 100 is controlled in the state in which the N screen function has been activated in accordance with the driving method of the mobile terminal 100 shown in FIG. 2.

FIG. 5(a) shows that the execution screen of a document application is displayed in the smart phone 100 and the TV 200, operating in conjunction with each other, in response to the activation of the N screen function. In the state of FIG. 5(a), a user lifts up the top of the smart phone 100. In response thereto, the controller 180 of the smart phone 100 can perform control so that the execution screen of a racing game application being executed in the smart phone 100 is displayed in the TV 200 and a user interface for performing the racing game is displayed in the smart phone 100, as shown in FIG. 5(b).

Assuming that the TV 200 switches to the execution screen of a moving image application, a user interface for controlling the operation of the moving image application can be displayed in the smart phone 100.

Figure 6:
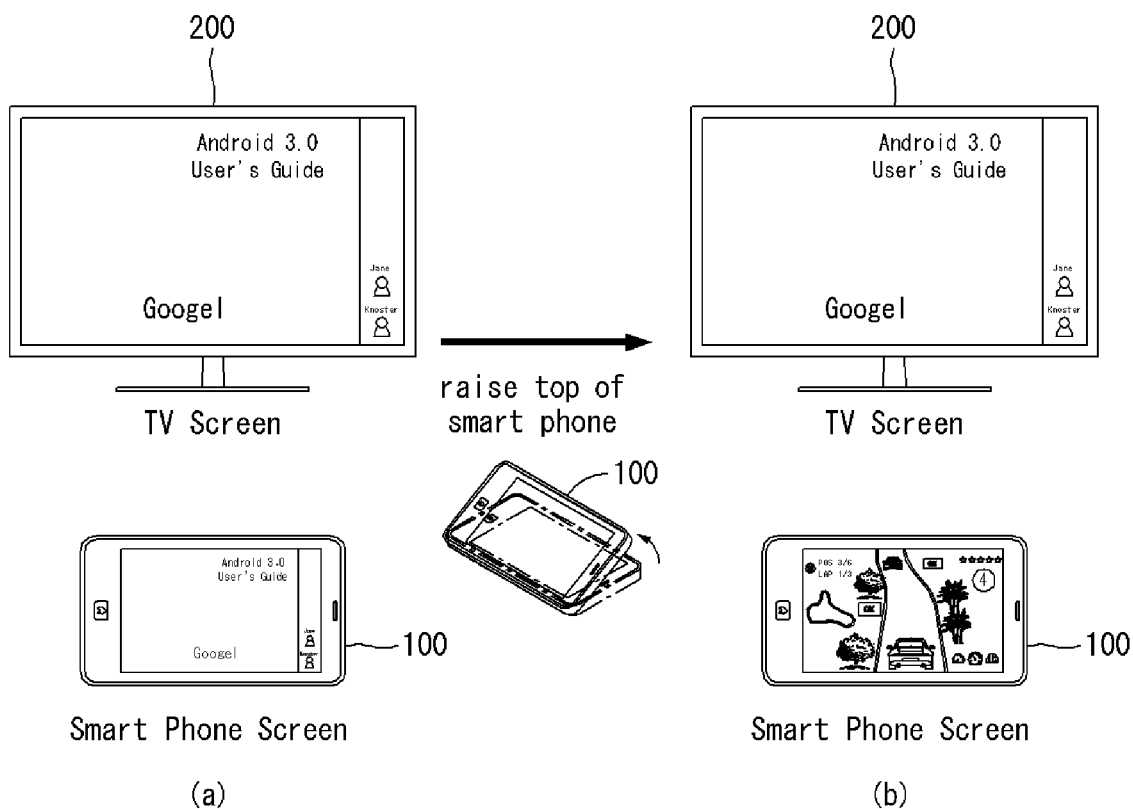
FIG. 6 is a diagram illustrating another example of the driving method of the mobile terminal according to the present invention.

FIG. 6 is a diagram illustrating another example of the driving method of the mobile terminal (e.g., a smart phone) 100 according to the present invention.

FIG. 6(a) shows that the execution screen of a document application is displayed in the smart phone 100 and TV 200, operating in conjunction with each other, in response to the activation of the N screen function. In the state of FIG. 6(a), a user lifts up the top of the smart phone 100. In response thereto, the controller 180 of the smart phone 100 can perform control so that the execution screen of the document application remains displayed in the TV 200 and the execution screen of the racing game application is displayed in the smart phone 100, as shown in FIG. 6(b).

That is, the mobile terminal 100 according to the present invention can set the mobile terminal 100 as output means, corresponding to an application being executed in the mobile terminal 100, based on the movement of the first type of the mobile terminal 100 that is sensed by the sensing unit 140.

As described above with reference to FIGS. 2 to 6, the mobile terminal 100 according to the present invention can set at least one of the display device 200 and the mobile terminal 100, operating in conjunction with each other in response to the activation of the N screen function, as output means corresponding to an application being executed in the mobile terminal 100 based on a specific sensed movement of the mobile terminal 100.

Figure 7:
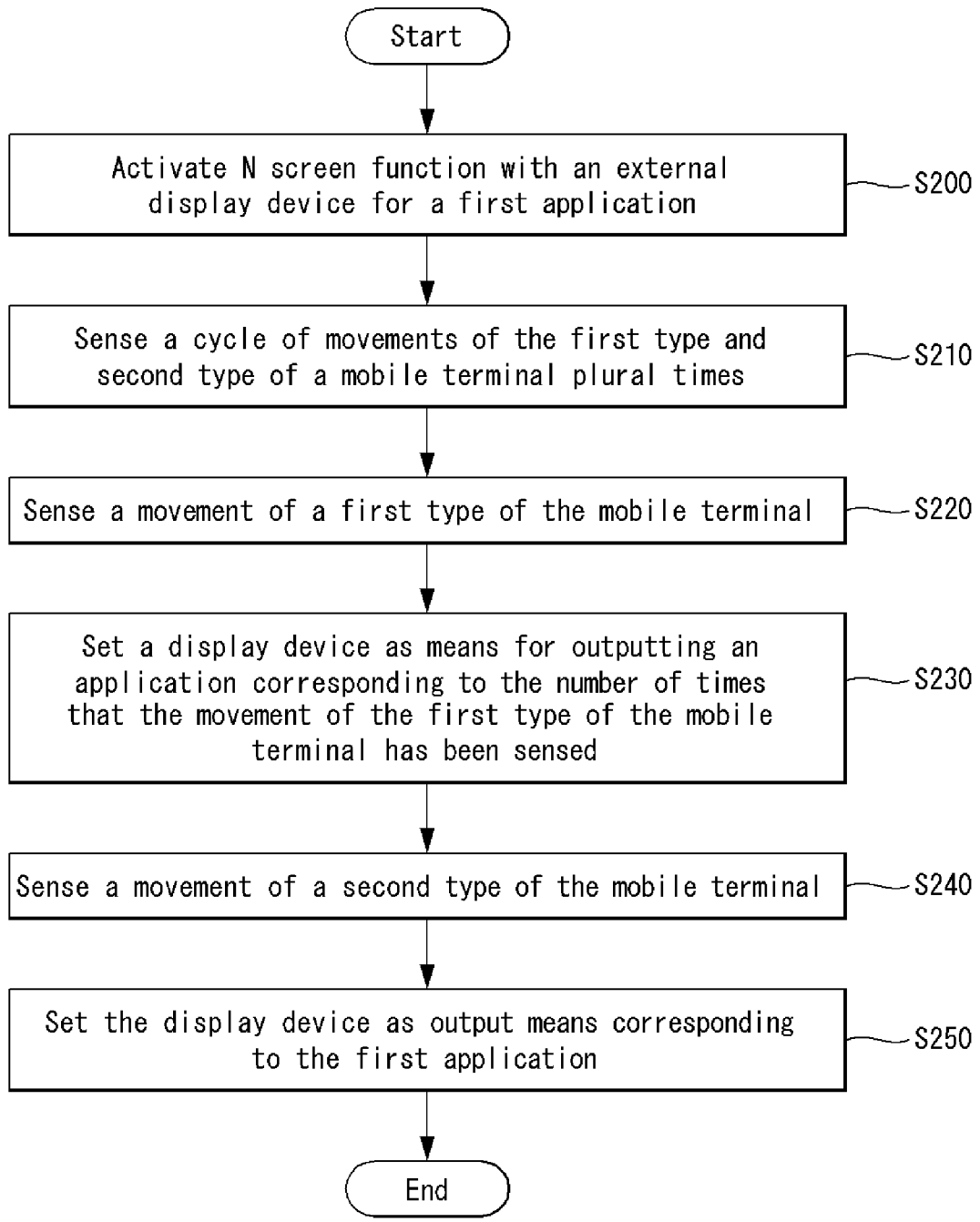
FIG. 7 is a flowchart illustrating another example of the driving method of the mobile terminal according to the present invention.

FIG. 7 is a flowchart illustrating another example of the driving method of the mobile terminal 100 according to the present invention. The driving method of the mobile terminal 100 is described below with reference to necessary drawings.

In the state in which the N screen function with an external display device has been activated on a first application being executed in the mobile terminal 100 at step S200, the sensing unit 140 senses a cycle of a movement of the first type and a cycle of a movement of a second type of the mobile terminal 100 plural times at step S210. Next, the sensing unit 140 senses a movement of a first type of the mobile terminal 100 at step S220.

In response to the sensing, the controller 180 of the mobile terminal 100 sets the display device 200 as means for outputting an application corresponding to the number of times that the movement of the first type of the mobile terminal 100 has been sensed at step S230.

Next, the sensing unit 140 senses a movement of a second type of the mobile terminal 100 at step S240. In response to the sensing, the controller 180 sets the display device 200 as output means corresponding to the first application again at step S250.

Figure 8:
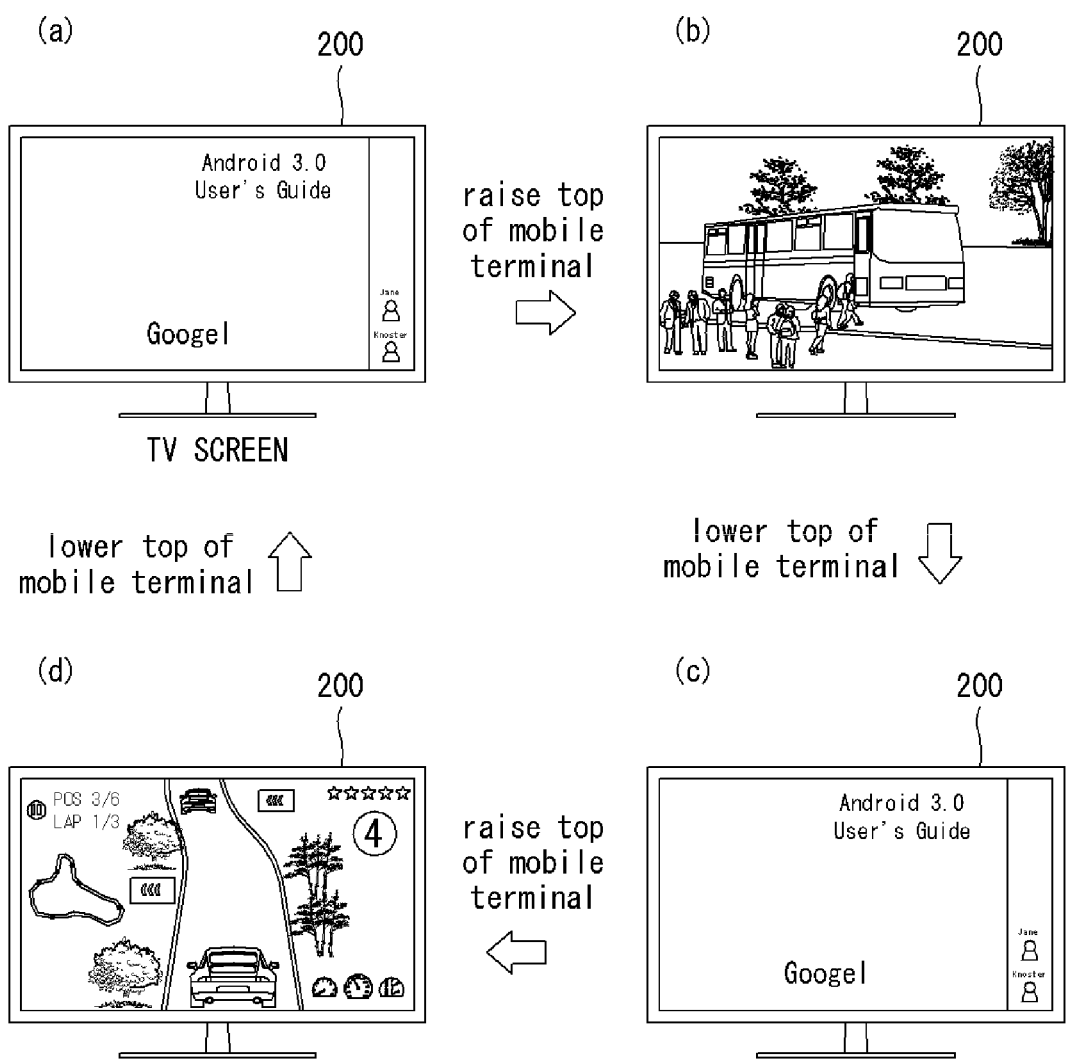
FIG. 8 shows an example in which the screen of an external display device operating in conjunction with the mobile terminal is controlled in the state in which the N screen function has been activated in accordance with the driving method of the mobile terminal shown in FIG. 7.

FIG. 8 shows an example in which the screen of an external display device (e.g., TV) 200 operating in conjunction with the mobile terminal 100 is controlled in the state in which the N screen function has been activated in accordance with the driving method of the mobile terminal 100 shown in FIG. 7.

FIG. 8(a) shows that the execution screen of a document application is displayed in TV 200, that is, a display device connected to the mobile terminal 100, in the state in which the N screen function has been activated. In the state of FIG. 8(a), a user lifts up the top of the mobile terminal 100 (i.e., the movement of the first type is sensed first).

In response thereto, the controller 180 of the mobile terminal 100 sets the TV 200 as output means corresponding to a moving image application that is being executed in the mobile terminal 100 or that is executed in the mobile terminal 100.

FIG. 8(b) shows an example in which the execution screen of the moving image application is displayed in the TV 200.

In the state of FIG. 8(b), a user takes down the top of the mobile terminal 100 again (i.e., the movement of the second type is sensed first). In response thereto, the controller 180 sets the TV 200 as output means corresponding to the document application again. FIG. 8(c) shows an example in which the execution screen of the document application is displayed in the TV 200.

In the state of FIG. 8(c), a user lifts up the top of the mobile terminal 100 again (i.e., the movement of the first type is sensed second. In response thereto, the controller 180 sets the TV 200 as output means corresponding to a racing game application that is being executed in the mobile terminal 100 or that is executed in the mobile terminal 100. FIG. 8(d) shows an example in which the execution screen of the racing game application is displayed in the TV 200.

In the state of FIG. 8(d), a user takes down the top of the mobile terminal 100 (i.e., the movement of the second type is sensed second). In response thereto, the controller 180 sets the TV 200, such as that shown in FIG. 8(a), as the output means corresponding to the document application again.

As described above with reference to FIGS. 7 and 8, when the sensing unit 140 repeatedly senses a predetermined movement of the first type and a predetermined movement of the second type of the mobile terminal 100, the mobile terminal 100 according to the present invention can change an application for which at least one of the mobile terminal 100 and the display device 200 is set as output means in response to the number of times that the movement of the first type of the mobile terminal 100 has been sensed.

Figure 9:
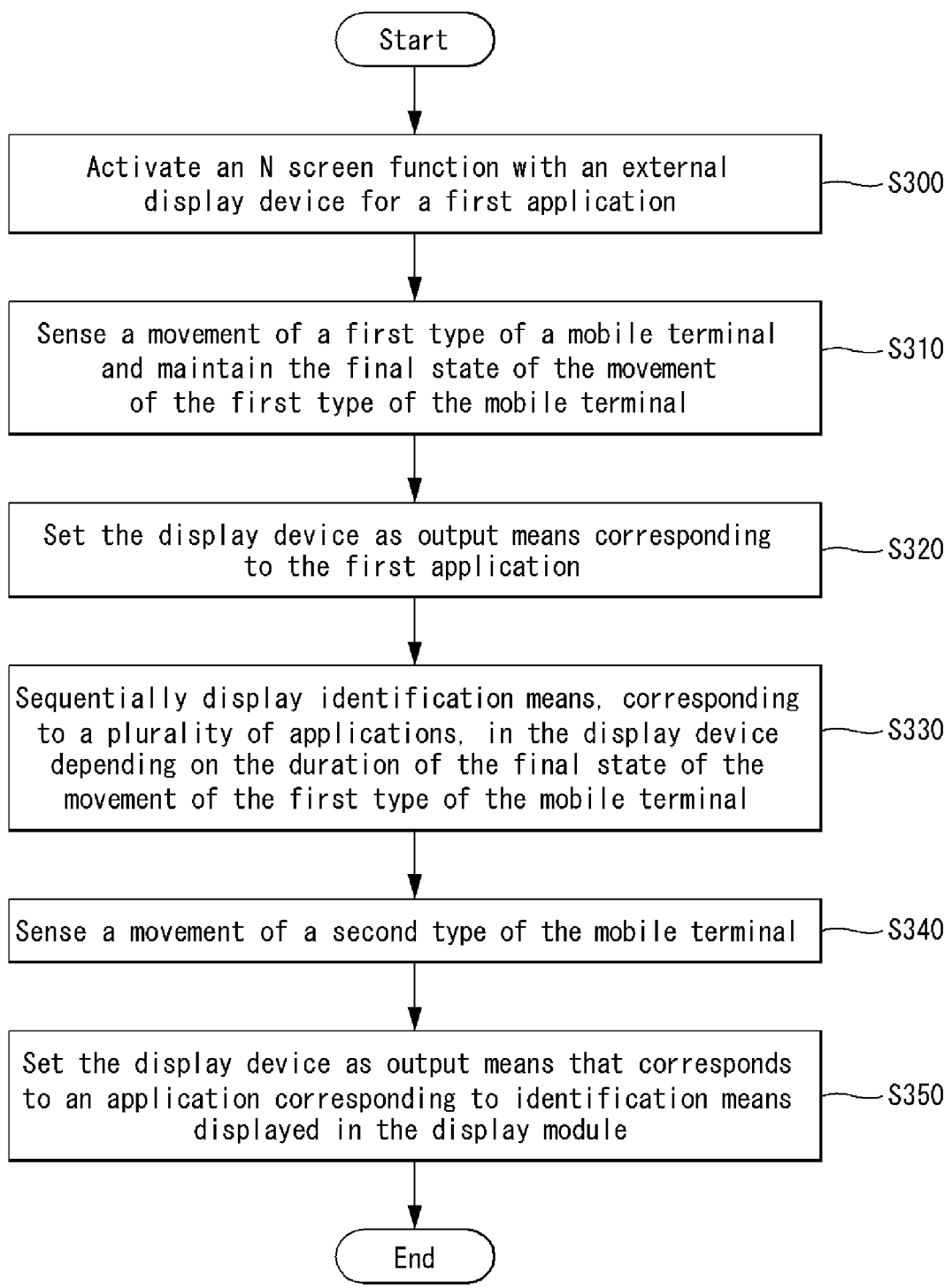
FIG. 9 is a flowchart illustrating yet another example of the driving method of the mobile terminal according to the present invention.

FIG. 9 is a flowchart illustrating yet another example of the driving method of the mobile terminal 100 according to the present invention. The driving method of the mobile terminal 100 is described below with reference to necessary drawings.

In the state in which the N screen function with an external display device 200 has been activated on a first application being executed in the mobile terminal 100 at step S300, the sensing unit 140 senses a movement of a first type of the mobile terminal 100, and the final state of the movement of the first type of the mobile terminal 100 remains intact at step S310.

In response thereto, the controller 180 of the mobile terminal 100 sets the display device 200 as output means corresponding to the first application at step S320. If the final state of the movement of the first type of the mobile terminal 100 continues for a specific time, the controller 180 sequentially displays identification means, corresponding to a plurality of applications, in the display device 200 depending on the duration of the final state of the movement of the first type of the mobile terminal 100 at step S330.

Here, the plurality of applications may be applications being executed (i.e., being multi-tasked) in the mobile terminal 100 or might have been previously predetermined to be executed when the applications are subsequently selected. Furthermore, the identification means corresponding to the applications can include all means for enabling a user to identify an application, such as the execution screen of an application or the icon of an application.

When the final state of the movement of the first type of the mobile terminal 100 continues, the sensing unit 140 senses a movement of a second type of the mobile terminal 100 while the identification means of the plurality of application is sequentially displayed in the display device 200 at step S340. In response to the sensing, the controller 180 sets the display device 200 as output means that corresponds to an application corresponding to identification means displayed in the display module 151 at step S350.

A method of setting the display device 200 as output means corresponding to the first application again can include a method of manipulating a home button or a cancel button included in the mobile terminal 100, a method of moving the mobile terminal 100 in a third type, and a method of making a gesture so that the gesture can be recognized by the camera 121 of the mobile terminal 100. It is however to be noted that the scope of the present invention is not limited to the methods.

Figure 10:
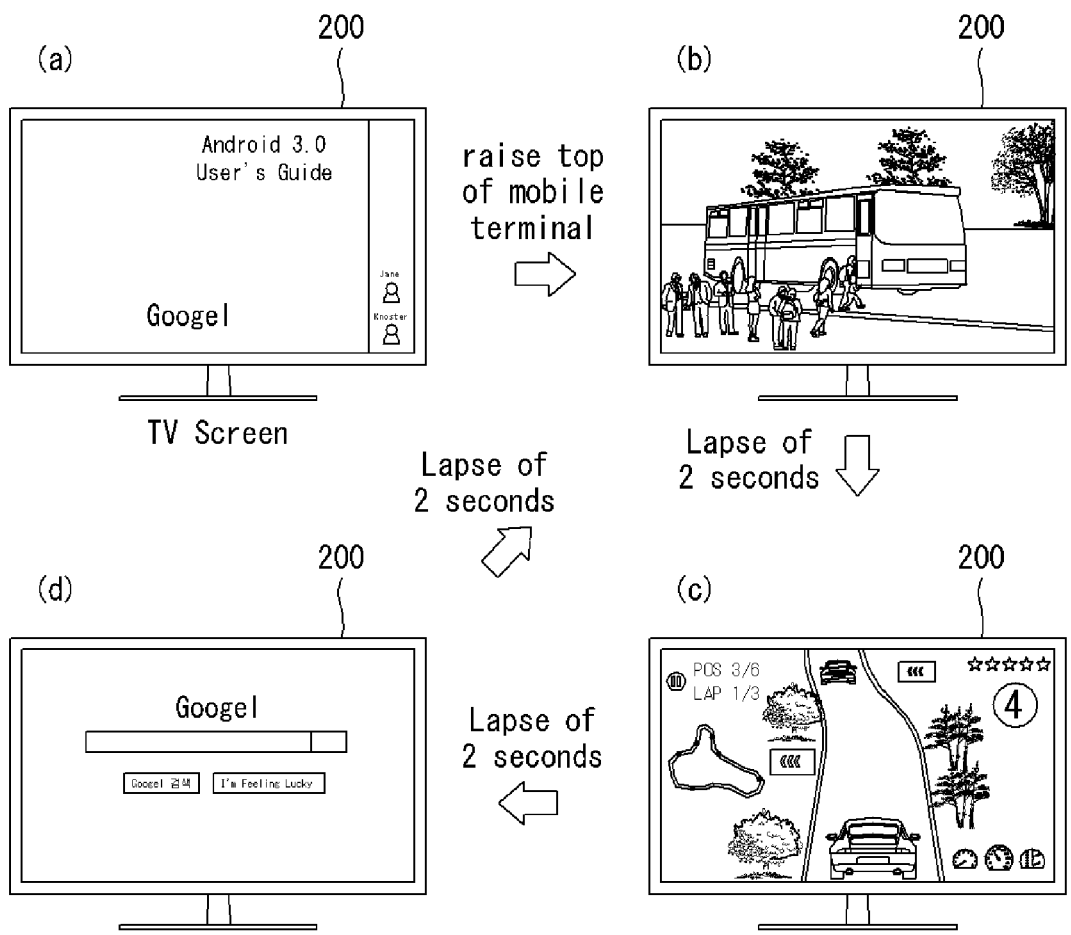
FIG. 10 shows an example in which the screen of an external display device operating in conjunction with the mobile terminal is controlled in the state in which the N screen function has been activated in accordance with the driving method of the mobile terminal shown in FIG. 9.

FIG. 10 shows an example in which the screen of an external display device (e.g., TV) 200 operating in conjunction with the mobile terminal 100 is controlled in the state in which the N screen function has been activated in accordance with the driving method of the mobile terminal 100 shown in FIG. 9.

FIG. 10(a) shows that the execution screen of a document application is displayed in the TV 200, that is, a display device connected to the mobile terminal 100, in the state in which the N screen function has been activated. In the state of FIG. 10(a), a user lifts up the top of the mobile terminal 100 (i.e., a movement of a first type of the mobile terminal is sensed first).

In response thereto, the controller 180 of the mobile terminal 100 sets the TV 200 as output means corresponding to a moving image application that is being executed in the mobile terminal 100 or that is executed in the mobile terminal 100. FIG. 10(b) shows that the execution screen of the moving image application is displayed in the TV 200.

In the state of FIG. 10(b), a user keeps raised the top of the mobile terminal 100 (i.e., the final state of the movement of the first type remains intact). In response thereto, the controller 180 changes the screen of the TV 200 into the execution screen of a racing game application (FIG. 8(c)), the execution screen of a web browser application (FIG. 8(d)), and the execution screen of a moving image application (FIG. 8(b)) sequentially every 2 seconds.

In the state in which the execution screen of a specific one of the applications is displayed in the TV 200, when a user takes down the top of the mobile terminal 100 again, the controller 180 can set the TV 200 as output means corresponding to the specific application.

A method of setting the TV 200 as output means corresponding to the document application that was originally displayed can include a method of moving the mobile terminal 100 in a predetermined type, a method of a user making a specific gesture, and a method of manipulating a button included in the mobile terminal 100, as described with reference to FIG. 9.

The driving method of the mobile terminal 100 according to the present invention in which, if a movement of a first type of the mobile terminal 100 remains intact, the identification means of a plurality of applications is displayed in the display device 200 connected to the mobile terminal 100 based on the activation of the N screen function and a user can set an application for which the display module 151 is set as output means while watching the identification means has been described above with reference to FIGS. 9 and 10.

In some embodiments, however, the mobile terminal 100 may display the identification means of a plurality of applications in the display module 151 of the mobile terminal 100, and thus a user may select an application for which the display device 200 will be set as output means while watching the display module 151. Furthermore, the identification means of the plurality of applications may be displayed both in the mobile terminal 100 and the display device 200.

Figure 11:
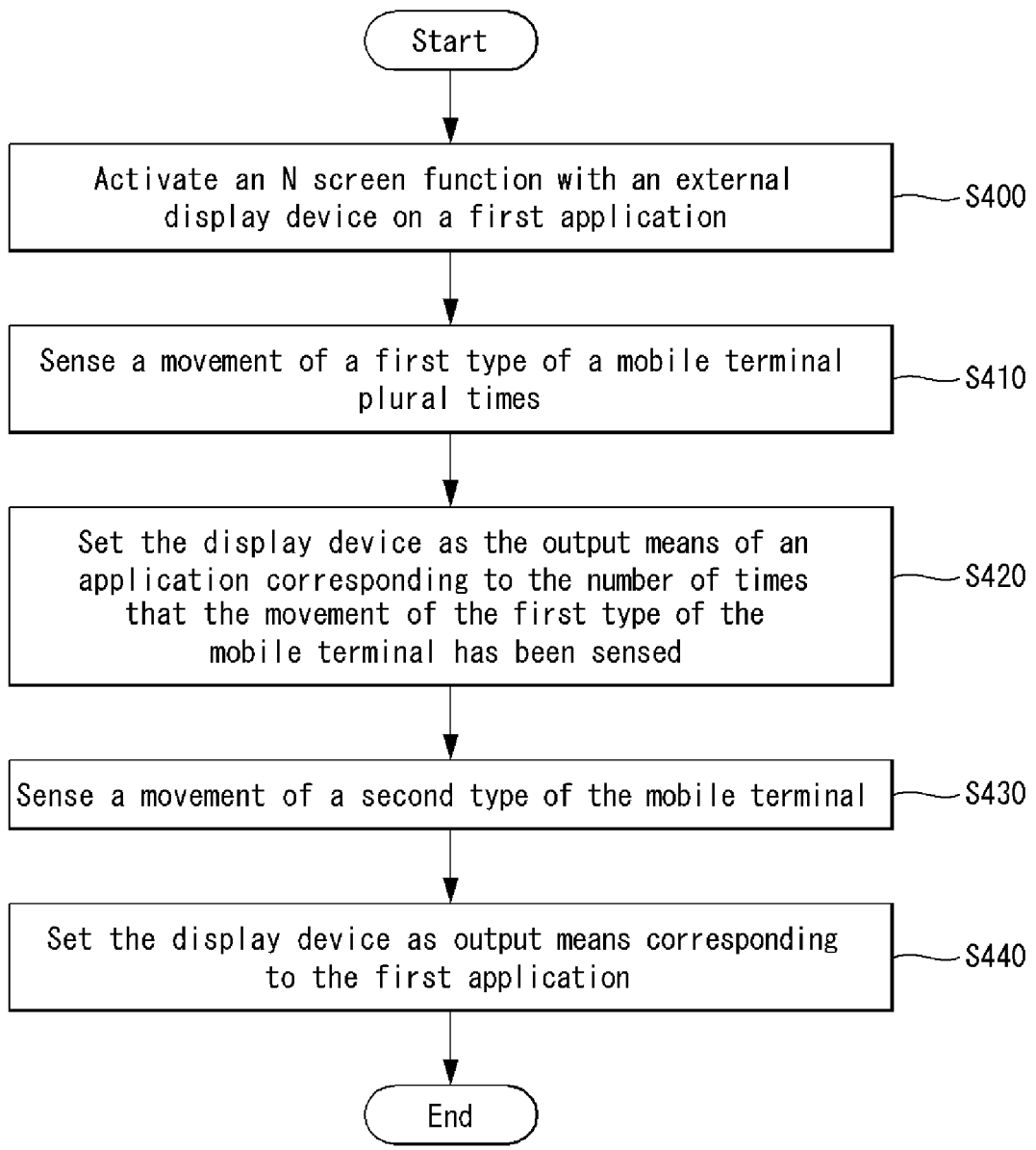
FIG. 11 is a flowchart illustrating further yet another example of the driving method of the mobile terminal according to the present invention.

FIG. 11 is a flowchart illustrating further yet another example of the driving method of the mobile terminal 100 according to the present invention. The driving method of the mobile terminal 100 is described below with reference to necessary drawings.

In the state in which the N screen function with an external display device 200 has been activated on a first application being executed in the mobile terminal 100 at step S400, the sensing unit 140 senses a movement of a first type of the mobile terminal 100 plural times at step S410. The movement of the first type of the mobile terminal 100 can be a movement in which the top, bottom, right side, or left side of the mobile terminal 100 is raised and lowered. It is however to be noted that the scope of the present invention is not limited to the movement.

In response to the sensing, the controller 180 of the mobile terminal 100 sets the display device 200 as the output means of an application that corresponds to the number of times that the movement of the first type of the mobile terminal 100 has been sensed at step S420. Next, the sensing unit 140 senses a movement of a second type of the mobile terminal 100 at step S430. In response to the sensing, the controller 180 sets the display device 200 as output means corresponding to the first application again at step S440.

That is, the mobile terminal 100 according to the present invention can change an application for which the display device 200 is set as output means depending on the number of times that a specific movement of the mobile terminal 100 is sensed. As described above, an application for which the display device 200 is set as the output means may be another application that is being multi-tasked in the mobile terminal 100 or may be an application that has been previously determined as an application for which the display device 200 is set as the output means depending on the number of times that the specific movement is sensed.

Figure 12:
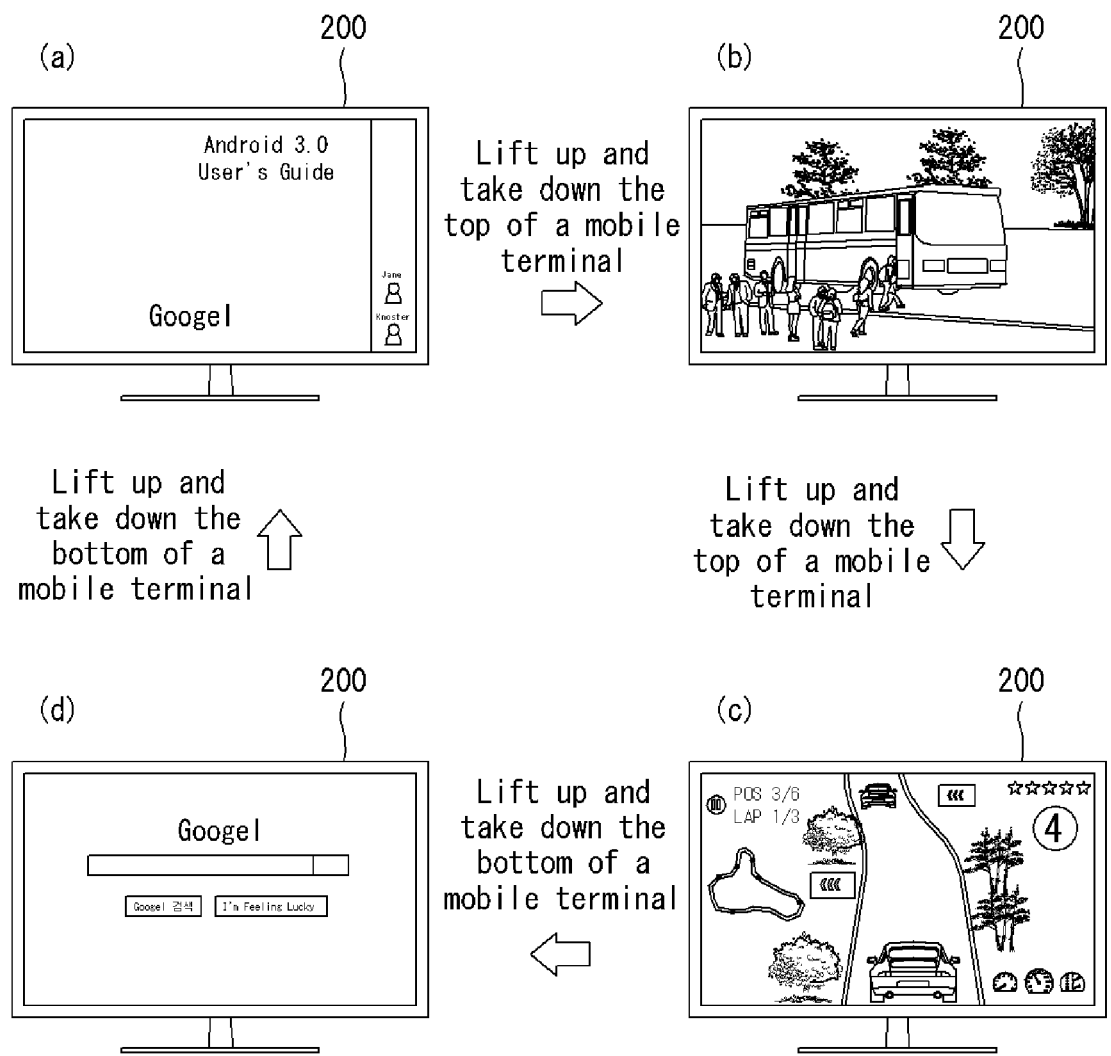
FIG. 12 shows an example in which the screen of an external display device operating in conjunction with the mobile terminal is controlled in the state in which the N screen function has been activated in accordance with the driving method of the mobile terminal shown in FIG. 11.

FIG. 12 shows an example in which the screen of an external display device (e.g., TV) 200 operating in conjunction with the mobile terminal 100 is controlled in the state in which the N screen function has been activated in accordance with the driving method of the mobile terminal 100 shown in FIG. 11.

FIG. 12(a) shows that the execution screen of a document application is displayed in the TV 200, that is, a display device connected to the mobile terminal 100, in the state in which the N screen function has been activated. In the state of FIG. 12(a), a user lifts up and takes down the top of the mobile terminal 100 (i.e., a movement of a first type of the mobile terminal 100 is sensed first).

In response thereto, the controller 180 of the mobile terminal 100 sets the TV 200 as output means corresponding to a moving image application that is being executed in the mobile terminal 100 or that is executed in the mobile terminal 100. FIG. 12(b) shows that the execution screen of the moving image application is displayed in the TV 200.

In the state of FIG. 12(b), a user lifts up and takes down the top of the mobile terminal 100 again (i.e., a movement of a first type of the mobile terminal 100 is sensed second). In response thereto, the controller 180 sets the TV 200 as output means corresponding to a racing game application. FIG. 12(c) shows that the execution screen of the racing game application is displayed in the TV 200.

In the state of FIG. 12(c), a user lifts up and takes down the top of the mobile terminal 100 again (i.e., a movement of a first type of the mobile terminal 100 is sensed third). In response thereto, the controller 180 sets the TV 200 as output means corresponding to a web browser application. FIG. 12(d) shows that the execution screen of the web browser application is displayed in the TV 200.

Meanwhile, in the state of FIG. 12(d), a user lifts up and takes down the bottom of the mobile terminal 100 (i.e., a movement of a second type of the mobile terminal 100 is sensed first). In response thereto, the controller 180 can set the TV 200 as output means corresponding to the document application.

Figure 13:
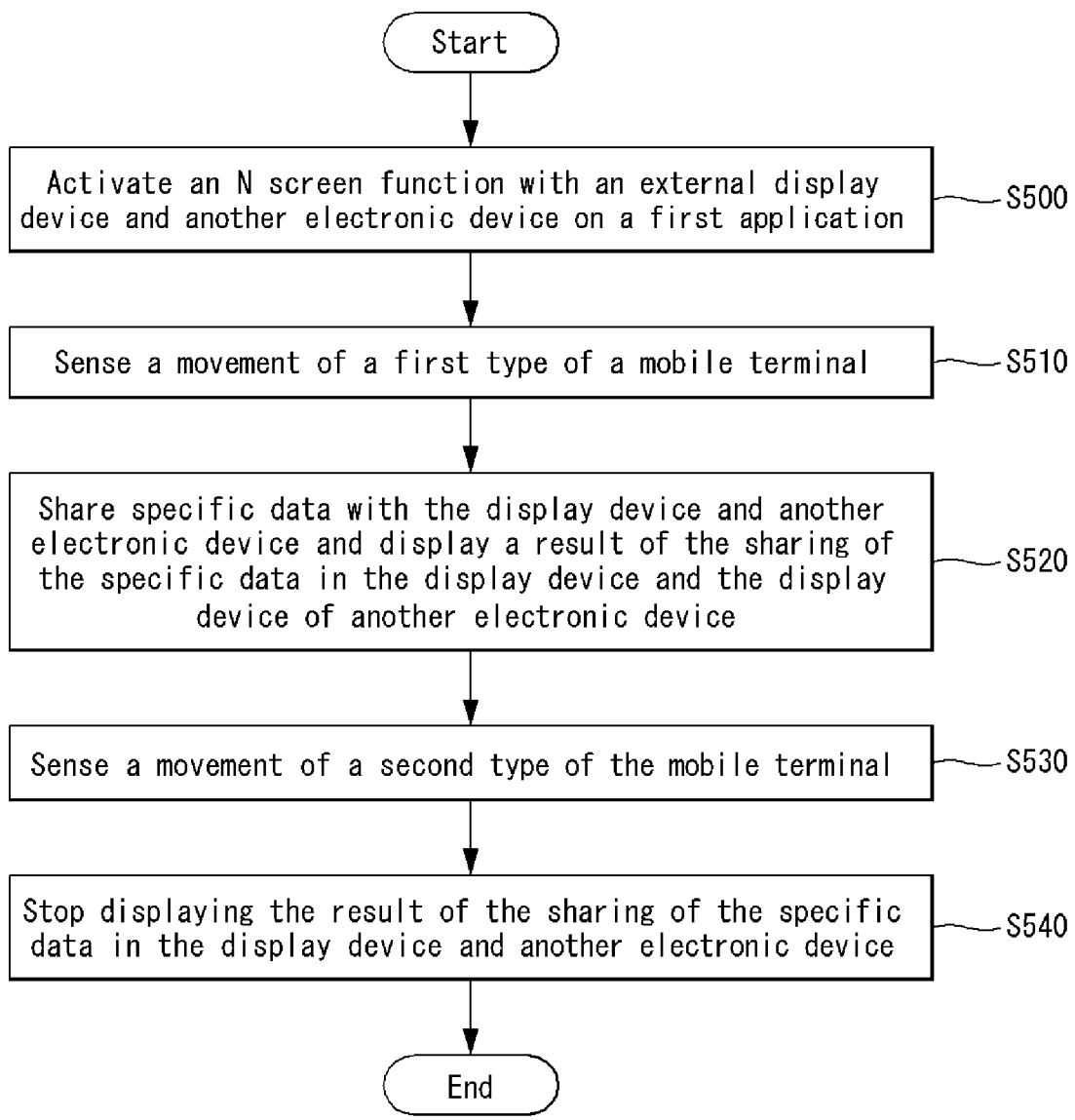
FIG. 13 is a flowchart illustrating further yet another example of the driving method of the mobile terminal according to the present invention.

FIG. 13 is a flowchart illustrating further yet another example of the driving method of the mobile terminal 100 according to the present invention. The driving method of the mobile terminal 100 is described below with reference to necessary drawings.

In the state in which the N screen function with an external display device 200 and another electronic device has been activated on a first application being executed in the mobile terminal 100 at step S500, the sensing unit 140 senses a movement of a first type of the mobile terminal 100 at step S510. Here, another electronic device may be a mobile terminal or a fixed electronic device, such as TV or a desktop PC.

In response to the sensing, the controller 180 of the mobile terminal 100 shares specific data with the display device 200 and another electronic device and displays a result of the sharing of the specific data in the display device 200 and display device of another electronic device at step S520.

Here, the specific data can include at least one of data generated in response to the movement of the first type of the mobile terminal 100, the execution screen of a second application being executed in the mobile terminal 100, a result of the execution of an application being executed in the mobile terminal 100, and a specific file stored in the memory 160 of the mobile terminal 100.

Next, the sensing unit 140 senses a movement of a second type of the mobile terminal 100 at step S530. In response to the sensing, the controller 180 stops displaying the result of the sharing of the specific data in the display device 200 and another electronic device at step S540.

Figure 14:
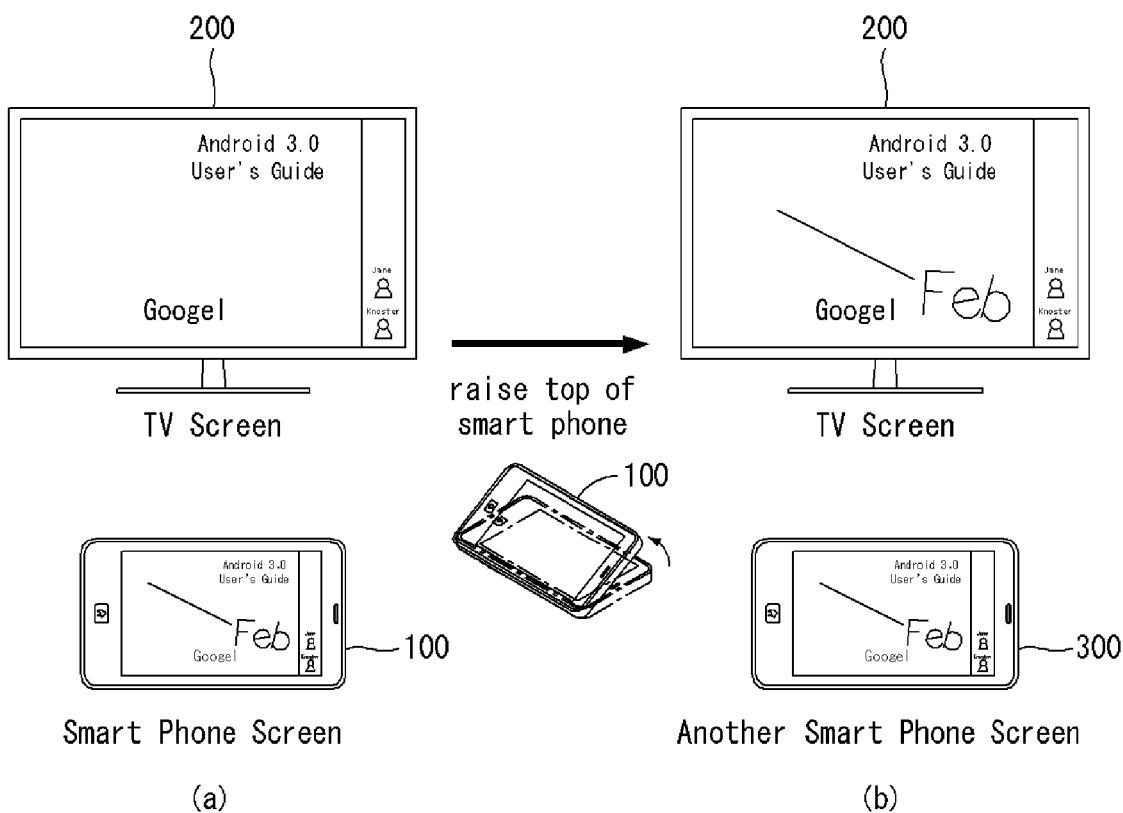
FIG. 14 shows an example in which the screen display states of an external display device and another mobile terminal which operate in conjunction with the mobile terminal are controlled in the state in which the N screen function has been activated in accordance with the driving method of the mobile terminal shown in FIG. 13.

FIG. 14 shows an example in which the screen display states of an external display device (e.g., TV) 200 and another mobile terminal 300 which operate in conjunction with the mobile terminal 100 are controlled in the state in which the N screen function has been activated in accordance with the driving method of the mobile terminal 100 shown in FIG. 13.

FIG. 14(a) shows that the execution screen of a document application is displayed in the TV 200, that is, a display device connected to the mobile terminal 100, in the state in which the N screen function has been activated. Furthermore, FIG. 14(a) shows that a memo application is executed in the mobile terminal 100 in the state in which the document application has been executed in the activation state of the N screen function and a user is writing a specific memo. In the state of FIG. 14(a), a user lifts up the top of the mobile terminal 100 (i.e., a movement of a first type of the mobile terminal 100 is sensed).

In response thereto, the controller 180 of the mobile terminal 100 shares the memo, written by the user in the mobile terminal 100, with the TV 200 and another smart phone 300. FIG. 14(b) shows that the memo is displayed in the TV 200 and another smart phone 300 as a result of the sharing.

FIG. 14 shows an example in which the memo written in the mobile terminal 100 is displayed in the execution screen of the document application in such a way as to overlap with the execution screen. In some embodiments, however, the memo written in the mobile terminal 100 can be displayed in an additional region that is separated from the execution screen of the document application. An area for the execution screen of the document application can be reduced. A method of sharing the memo written in the mobile terminal 100 and displaying a result of the sharing in the TV 200 is not limited to the above examples.

Figure 15:
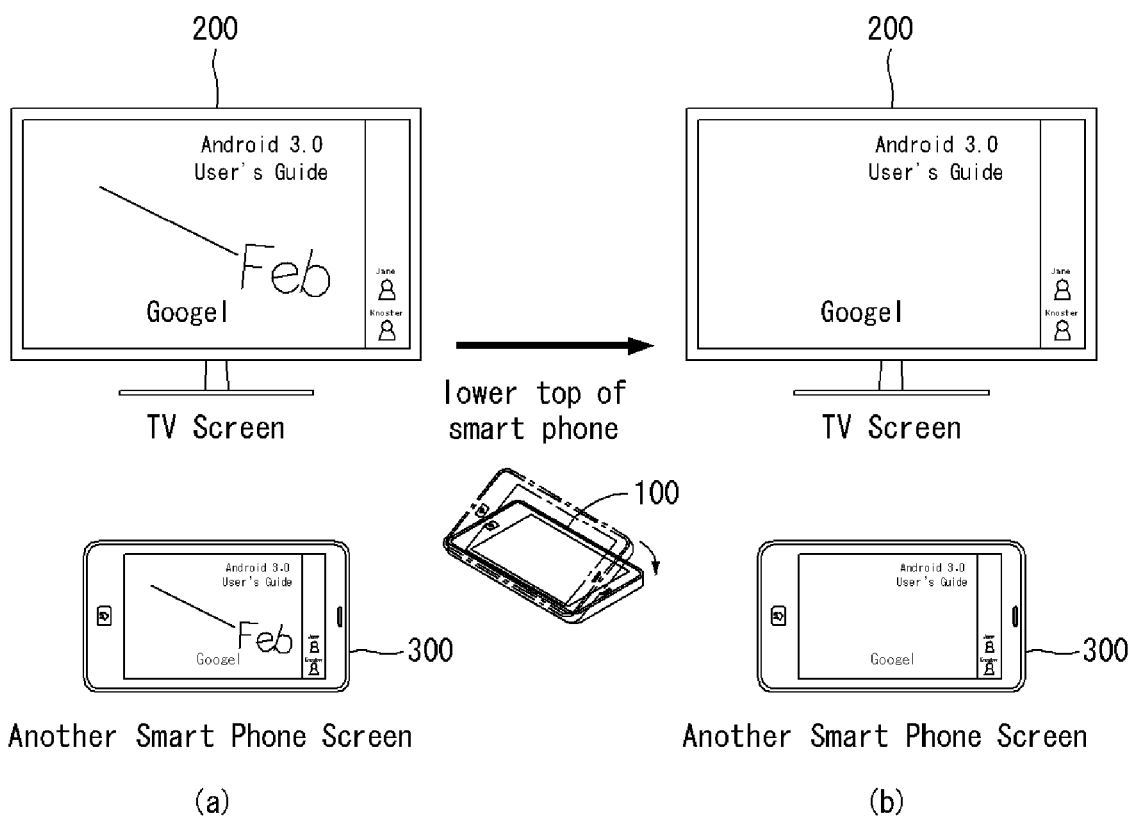
FIG. 15 shows another example in which the screen display states of an external display device and another mobile terminal which operate in conjunction with the mobile terminal are controlled in the state in which the N screen function has been activated in accordance with the driving method of the mobile terminal shown in FIG. 13.

FIG. 15 shows another example in which the screen display states of the external display device (e.g., TV) 200 and another mobile terminal 300 which operate in conjunction with the mobile terminal 100 are controlled in the state in which the N screen function has been activated in accordance with the driving method of the mobile terminal 100 shown in FIG. 13.

The state of FIG. 15(a) is the same as the state of FIG. 14(b). In the state of FIG. 15(a), a user takes down the top of the mobile terminal 100 that has been raised (i.e., a movement of a second type of the mobile terminal 100 is sensed). In response thereto, the controller 180 can stop displaying a result of the sharing of a memo, that is, the memo, in the TV 200 and another smart phone 300. FIG. 15(b) shows that the memo displayed in the TV 200 and another smart phone 300 has disappeared.

Figure 16:
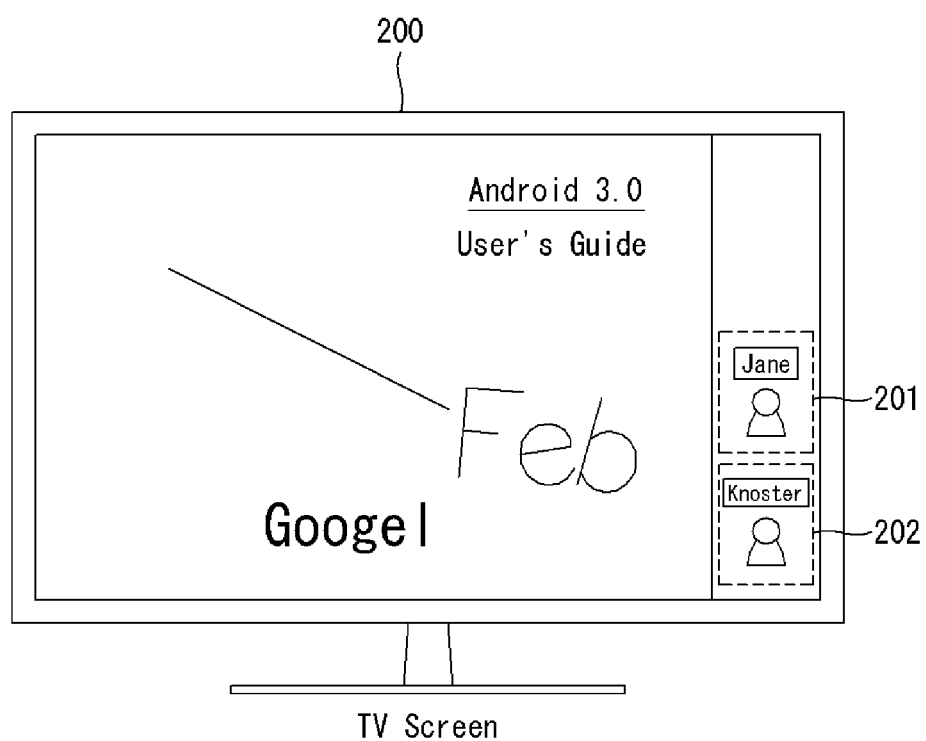
FIG. 16 shows that icons indicative of the mobile terminal according to the present invention and another mobile terminal operating in conjunction therewith are displayed in a display device based on the activation of the N screen function in accordance with the driving method of the mobile terminal shown in FIG. 13.

FIG. 16 shows that icons 201 and 202 indicative of the mobile terminal 100 according to the present invention and another mobile terminal operating in conjunction therewith are displayed in a display device 200 based on the activation of the N screen function in accordance with the driving method of the mobile terminal 100 shown in FIG. 13.

From FIG. 16, it can be seen that the icon 201 indicative of the mobile terminal 100 of the present invention and the icon 202 indicative of another mobile terminal, both operating in conjunction with each other based on the N screen function with the TV 200, are displayed in a screen of the TV 200. In this case, the users of mobile terminals can check the names of users displayed along with the icons 201 and 202 and check whether the users displayed along with the icons 201 and 202 are supplied with a sharing screen through the TV 200 according to the N screen function.

Figure 17:
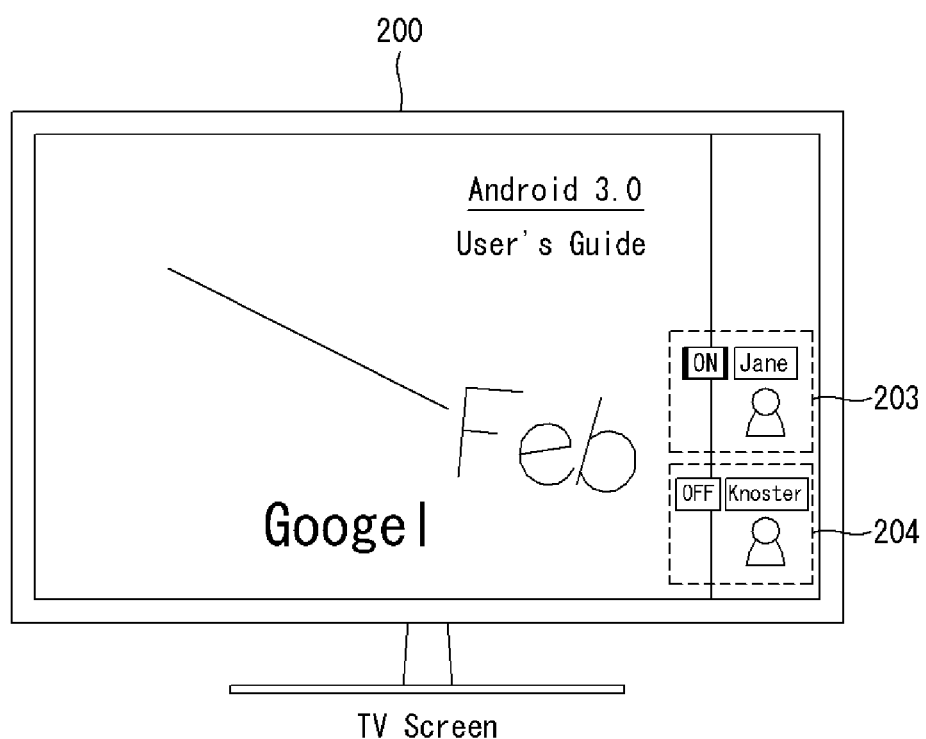
FIG. 17 shows that icons indicative of the mobile terminal according to the present invention and another mobile terminal operating in conjunction therewith are displayed in a display device in accordance with the driving method of the mobile terminal shown in FIG. 13.

FIG. 17 shows that icons 203 and 204 indicative of the mobile terminal 100 according to the present invention and another mobile terminal operating in conjunction therewith are displayed in a display device 200 in accordance with the driving method of the mobile terminal 100 shown in FIG. 13.

From FIG. 17, it can be seen that the icon 203 indicative of the mobile terminal 100 according to the present invention and the icon 204 indicative of another mobile terminal, both operating in conjunction with each other based on the N screen function with the TV 200, are displayed in a screen of the TV 200. In this case, users of mobile terminals can check the names of users displayed along with the icons 203 and 204 and information on whether a memo is shared between the users or not and also check a user who is supplied with a sharing screen through the TV 200 and whether the users share the memory based on the N screen function.

Meanwhile, in FIGS. 16 and 17, the execution screen of the document application is displayed in the TV 200. The document application may be being executed in any one of the mobile terminals. Furthermore, the memory is displayed on the execution screen of the document application in the TV 200. The memo may be a memory that has been written in any one of the mobile terminals.

Furthermore, FIGS. 16 and 17 show an example in which the icons and names of the mobile terminals operating in conjunction with each other are displayed in a screen of the TV 200 in response to the activation of the N screen function, but means displayed in a screen of the TV 200 in order to identify the mobile terminals operating in conjunction with each other is not limited to the icon. For example, the identification means may include a photograph, a telephone number, etc. of a user.

Figure 18:
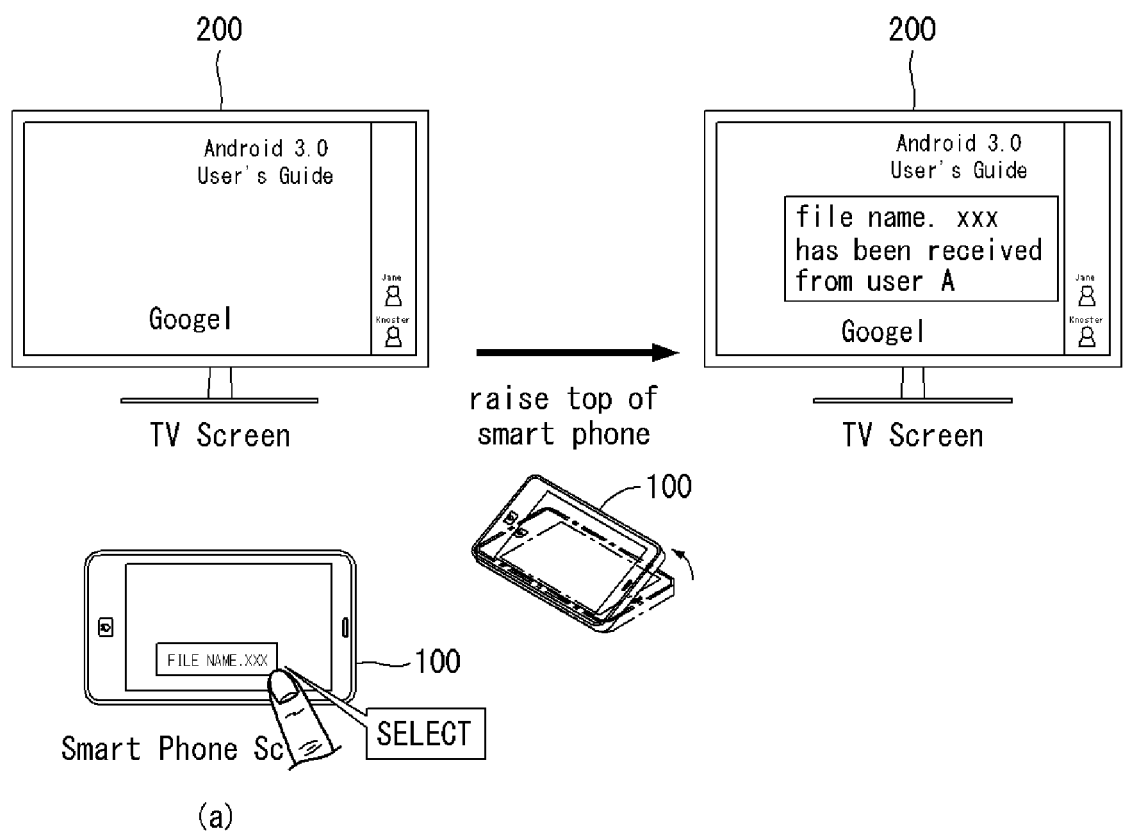
FIG. 18 shows an example in which the screen display state of an external display device operating in conjunction with another mobile terminal is controlled in the state in which the N screen function has been activated in accordance with the driving method of another mobile terminal of the present invention.

FIG. 18 shows an example in which the screen display state of an external display device (e.g., TV) 200 operating in conjunction with another mobile terminal 100 is controlled in the state in which the N screen function has been activated in accordance with the driving method of another mobile terminal 100 of the present invention.

FIG. 18(a) shows that the execution screen of a document application is displayed in the TV 200, that is, a display device connected to the mobile terminal 100, in the state in which the N screen function has been activated. Furthermore, FIG. 18(a) shows that a memo application is executed in the mobile terminal 100 in the state in which the document application has been executed in the activation state of the N screen function and a user has selected a specific file to be shared using the N screen function. In the state of FIG. 18(a), a user lifts up the top of the mobile terminal 100 (i.e., a movement of a first type of the mobile terminal is sensed).

In response thereto, the controller 180 of the mobile terminal 100 shares the specific file, selected by the user in the mobile terminal 100, with the TV 200. FIG. 18(b) shows that a result of the sharing of the file is displayed in the TV 200. Although not shown in FIG. 18(b), the display of the sharing of a selected file and a result of the sharing of the selected file may also be performed in another mobile terminal operating in conjunction with the mobile terminal 100 through the medium of the N screen function.

Figure 19:
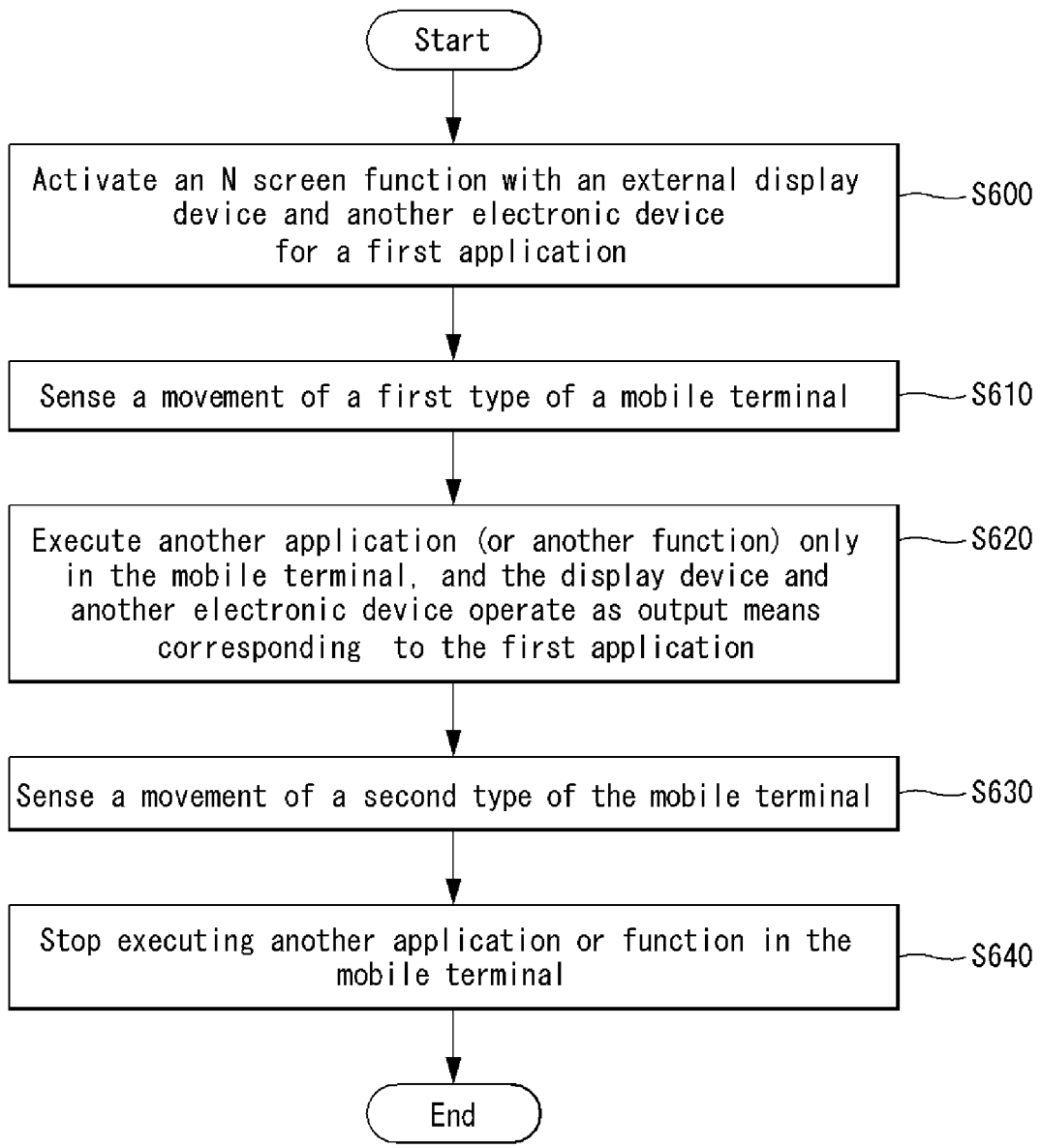
FIG. 19 is a flowchart illustrating further yet another example of the driving method of the mobile terminal according to the present invention.

FIG. 19 is a flowchart illustrating further yet another example of the driving method of the mobile terminal 100 according to the present invention. The driving method of the mobile terminal 100 is described below with reference to necessary drawings.

In the state in which the N screen function with an external display device and another electronic device has been activated on a first application that is being displayed in the mobile terminal 100 in foreground at step S600, the sensing unit 140 senses a movement of a first type of the mobile terminal 100 at step S610. Here, another electronic device may be a mobile terminal or a fixed electronic device, such as TV or a desktop PC.

In response to the sensing, the controller 180 of the mobile terminal 100 executes another application or another function only in the mobile terminal 100 at step S520. Thus, the mobile terminal 100 can be set as output means corresponding to another application. Furthermore, the mobile terminal 100 can output a result of the execution of another function in the mobile terminal 100 through the mobile terminal 100. Here, another function can be a specific function related to the first application.

In this case, the mobile terminal 100 can execute the first application, being executed in foreground, in background, but the external display device and another electronic device can operate as output means corresponding to the first application. Accordingly, a user of the mobile terminal 100 can execute an application or another function in the mobile terminal 100 even in the state in which the N screen function with the display device and another electronic device has been activated on the first application being executed in the mobile terminal 100.

Next, the sensing unit 140 senses a movement of a second type of the mobile terminal 100 at step S630. In response to the sensing, the controller 180 stops executing another application or function in the mobile terminal 100 at step S640.

Figure 20:
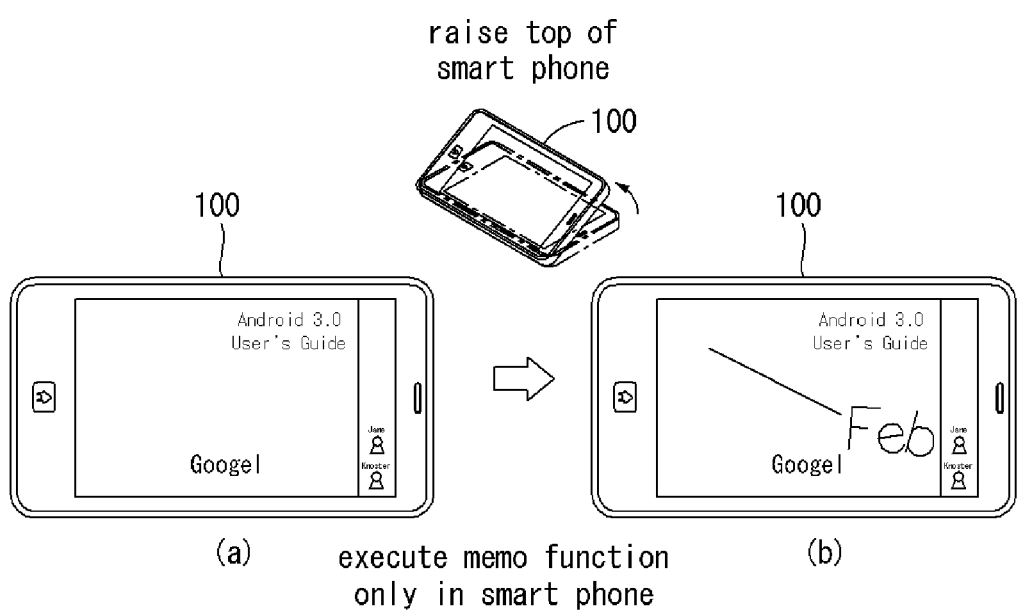
FIG. 20 shows an example in which the output state of the mobile terminal is controlled in accordance with the driving method of the mobile terminal shown in FIG. 19.

FIG. 20 shows an example in which the output state of the mobile terminal (e.g., a smart phone) 100 is controlled in accordance with the driving method of the mobile terminal 100 shown in FIG. 19.

FIG. 20(a) shows that the execution screen of a document application is displayed in the smart phone 100 in the state in which the N screen function has been activated. Although not shown, the execution screen of the document application may be displayed in an external display device and another electronic device which operate in conjunction with each other based on the N screen function with the smart phone 100.

In the state of FIG. 20(a), a user lifts up the top of the smart phone 100 (i.e., a movement of a first type of the smart phone 100 is sensed). In response thereto, the controller 180 of the smart phone 100 can execute a memo function in the smart phone 100 as shown in FIG. 20(b).

Figure 21:
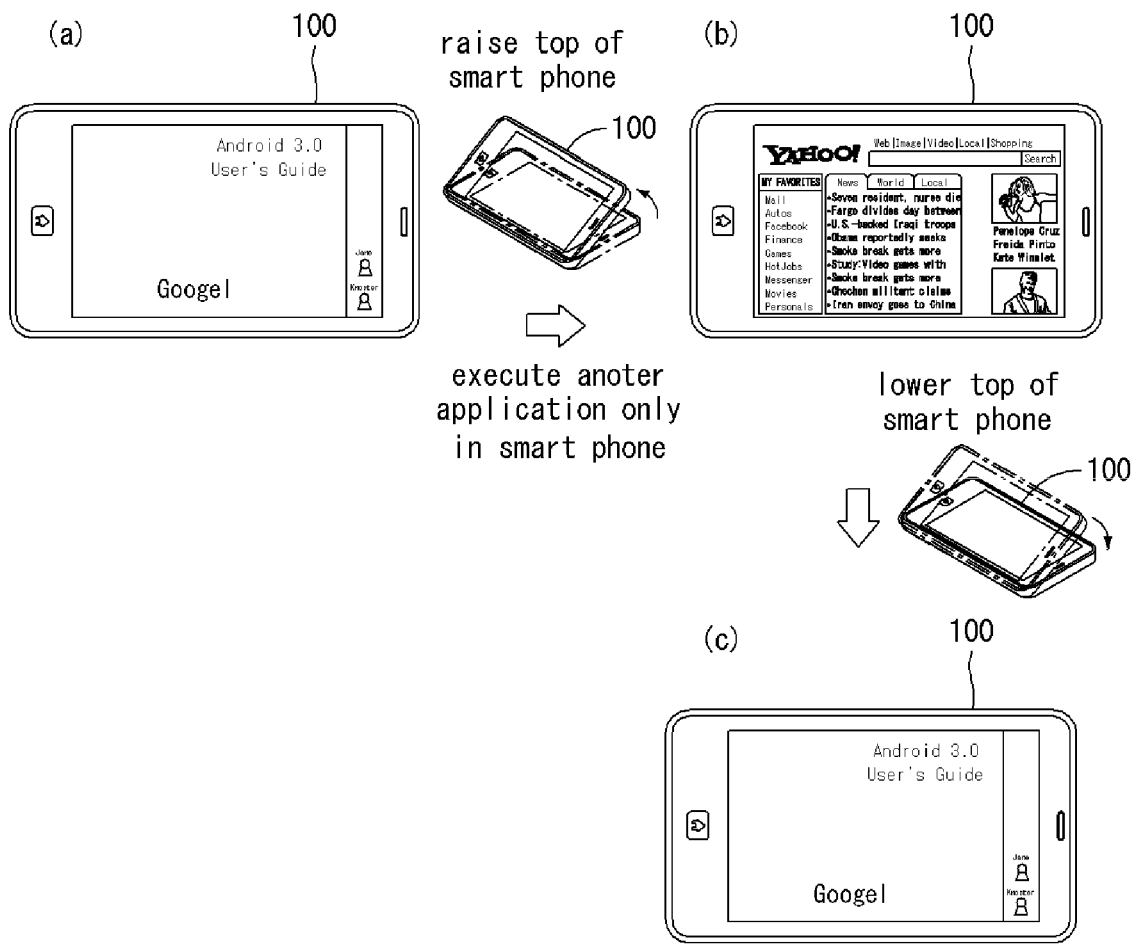
FIG. 21 shows another example in which the output state of the mobile terminal is controlled in accordance with the driving method of the mobile terminal shown in FIG. 19.

FIG. 21 shows another example in which the output state of the mobile terminal (e.g., a smart phone) 100 is controlled in accordance with the driving method of the mobile terminal 100 shown in FIG. 19.

FIG. 21(a) shows that the execution screen of a document application is displayed in the smart phone 100 in the state in which the N screen function has been activated. Although not shown, the execution screen of the document application may be displayed in an external display device and another electronic device which operate in conjunction with each other based on the N screen function with the smart phone 100.

In the state of FIG. 21(a), a user lifts up the top of the smart phone 100 (i.e., a movement of a first type of the smart phone 100 is sensed). In response thereto, the controller 180 of the smart phone 100 executes another application in the smart phone 100 and displays the execution screen of another application in the smart phone 100 as shown in FIG. 21(b).

When a user takes down the top of the smart phone 100 in the state of FIG. 21(b) (i.e., a movement of a second type of the smart phone 100 is sensed), the controller 180 can terminate the execution of another application and sets the screen of the smart phone 100 only for the document application as shown in FIG. 21(c).

FIGS. 20 and 21 illustrate that another application or function is displayed on the execution screen of an application or function being executed in the smart phone 100 in such a way as to overlap with the screen. In some embodiments, the execution screen of the application or function being executed in the smart phone 100 can be displayed in an additional area that is separated from the execution screen of the document application that has been previously executed. Here, an area for the execution screen of the document application can be reduced.

Although not shown in FIGS. 20 and 21, the smart phone 100 can occupy a position as output means for the document application in the display device or another electronic device which operate in conjunction with the smart phone 100. Accordingly, a user of the smart phone 100 can execute another application or another function even when the N screen function for the document application has been activated.

Figure 22:
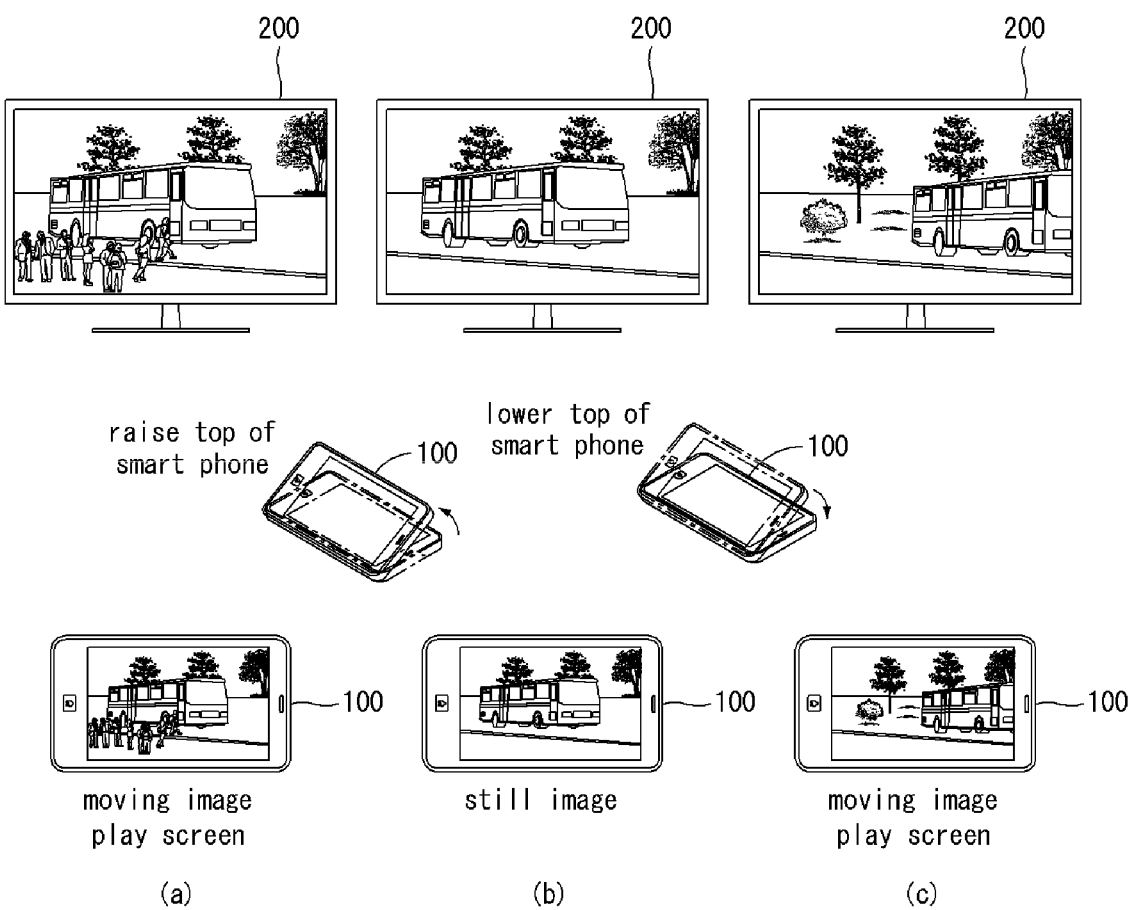
FIG. 22 shows yet another example in which the output state of the mobile terminal is controlled in accordance with the driving method of the mobile terminal shown in FIG. 19.

FIG. 22 shows yet another example in which the output state of the mobile terminal (e.g., a smart phone) 100 is controlled in accordance with the driving method of the mobile terminal 100 shown in FIG. 19.

FIG. 22(a) shows that the execution screen of a moving image application is displayed in the smart phone 100 and TV 200 in the state in which the N screen function has been activated. In the state of FIG. 22(a), a user lifts up the top of the smart phone 100 (i.e., a movement of a first type of the smart phone 100 is sensed). In response thereto, the controller 180 of the smart phone 100 can perform control so that a still image is displayed in the smart phone 100 while the execution screen of the moving image application continues to be displayed in the TV 200, as shown in FIG. 22(b). Accordingly, a user of the smart phone 100 can analyze, edit, and store the still image while not hindering other users who watch a moving image through the TV 200.

When a user takes down the top of the smart phone 100 in the state of FIG. 22(b) (i.e., a movement of a second type of the smart phone 100 is sensed), the controller 180 performs control so that the output of the still image in the smart phone 100 is stopped and the execution screen of the moving image application is displayed in the smart phone 100 again, as shown in FIG. 22(c).

As described above with reference to FIG. 22, even when the N screen function for a specific application is performed in the mobile terminal 100 according to the present invention, a user can perform a specific function related to the specific application independently from the N screen function.

Figure 23:
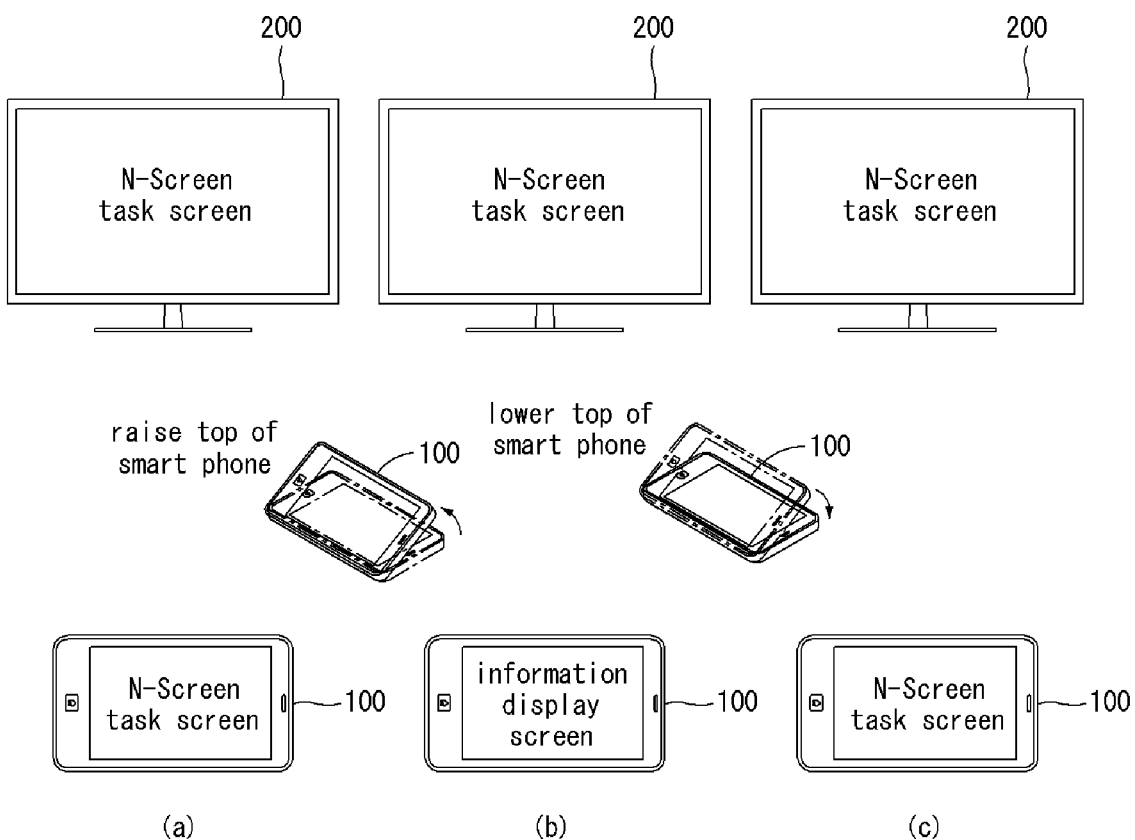
FIG. 23 shows further yet another example in which the output state of the mobile terminal is controlled in accordance with the driving method of the mobile terminal shown in FIG. 19.

FIG. 23 shows further yet another example in which the output state of the mobile terminal (e.g., a smart phone) 100 is controlled in accordance with the driving method of the mobile terminal 100 shown in FIG. 19.

FIG. 23(a) shows that the execution screen of a specific application (e.g., an N-screen task screen) is displayed in the smart phone 100 and TV 200 in the state in which the N screen function for the specific application has been activated. In the state of FIG. 23(a), a user lifts up the top of the smart phone 100 (i.e., a movement of a first type of the smart phone 100 is sensed).

In response thereto, the controller 180 of the smart phone 100 can perform control so that the execution screen of the specific application continues to be displayed in the TV 200 and specific information is displayed in the smart phone 100, as shown in FIG. 23(b). Accordingly, a user of the smart phone 100 can obtain specific information while not hindering other users who watch a moving image through the TV 200.

The specific information can be time information, schedule information, information related to sent and received calls, information related to sent and received messages, weather information, and information relate to a specific event. It is however to be noted that the scope of the present invention is not limited to the examples. The specific information might have been set by default when fabricating the smart phone 100 and may be set by a user's taste.

When a user takes down the top of the smart phone 100 (i.e., a movement of a second type of the smart phone 100 is sensed) in the state of FIG. 23(b), the controller 180 performs control so that the output of the specific information through the smart phone 100 is stopped and the execution screen of the specific application is displayed in the smart phone 100 again, as shown in FIG. 23(c).

As described above with reference to FIG. 23, even when the N screen function for the specific application is performed in the mobile terminal 100 according to the present invention, a user can obtain a variety of pieces of information irrespective of the N screen function.

In accordance with the present invention, a user of the mobile terminal according to the present invention can change an application, that is, the object of a content sharing function, by way of a simple and intuitive manipulation for the mobile terminal.

Furthermore, a user of the mobile terminal according to the present invention can share data with other electronic devices by way of a simple and intuitive manipulation for the mobile terminal even when a content sharing function has been activated.

Furthermore, a user of the mobile terminal according to the present invention can execute other applications or functions independently from a content sharing function by way of a simple and intuitive manipulation for the mobile terminal even when the content sharing function has been activated.

The above-described methods performed in the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal capable of performing a content sharing function with an external display device, the mobile terminal comprising:
   a display module;
   a radio communication unit configured to communicate wirelessly with the display device;
   a sensing unit configured to sense a movement of the mobile terminal; and
   a controller configured to activate the content sharing function for a second application when the sensing unit senses a first type movement of the mobile terminal in a state in which the content sharing function for a first application has been activated.

2. The mobile terminal of claim 1, wherein the second application is another application being executed in the mobile terminal or an application previously determined to be executed in the mobile terminal in response to the first type movement of the mobile terminal.

3. The mobile terminal of claim 2, wherein the controller is further configured to re-activate the content sharing function for the first application when the sensing unit senses a second type movement of the mobile terminal in the state in which the content sharing function for the second application has been activated.

4. The mobile terminal of claim 3, wherein the controller is further configured to change an application for executing the content sharing function according to a number of times that the first type movement of the mobile terminal is sensed when a combination of the first type movement and the second type movement is repeatedly sensed.

5. The mobile terminal of claim 2, wherein the controller is further configured to:
   cause at least the display device or the display module to sequentially display a plurality of identification elements corresponding to a plurality of applications when a final state of the first type movement of the mobile terminal continues for at least a specific period of time; and
   set the display device as a content sharing display for an application corresponding to an identification element among the displayed plurality of identification elements when a second type movement of the mobile terminal predetermined according to the first type movement of is sensed in the final state of the first type movement.

6. The mobile terminal of claim 2, wherein the controller is further configured to set the display device as a content sharing display for a specific application that corresponds to a number of times that the first type movement is sensed when the first type movement is sensed multiple times.

7. The mobile terminal of claim 1, wherein the controller is further configured to cause the display module to display a user interface for controlling a state or operation of the second application when the display device is set as a content sharing display for the second application.

8. A mobile terminal capable of operating in conjunction with an external display device and another electronic device based on a content sharing function, the mobile terminal comprising:
   a radio communication unit configured to communicate wirelessly with the display device and the another electronic device;
   a sensing unit configured to sense a movement of the mobile terminal; and
   a controller configured to:
     share specific data with the display device and the another electronic device when the sensing unit senses a first type movement of the mobile terminal in a state in which the content sharing function for a first application has been activated; and
     cause the display device and a display device of the another electronic device to display a result of the sharing of the specific data.

9. The mobile terminal of claim 8, wherein the controller is further configured to cause the display device and the display device of the another electronic device to stop the displaying of the result of the sharing of the specific data when the sensing unit senses a second type movement of the mobile terminal.

10. The mobile terminal of claim 9, wherein the specific data comprise at least one of data generated in response to the first type movement, an execution screen of a second application being executed in the mobile terminal, a result of an execution of an application being executed in the mobile terminal, or a specific file stored in memory of the mobile terminal.

11. The mobile terminal of claim 9, wherein the specific data comprise a memo file written in the mobile terminal.

12. The mobile terminal of claim 11, wherein the controller is further configured to cause the display device and the display device of the another electronic device to display the memo file in an execution screen of the first application in such a way as to overlap with the execution screen of the first application.

13. The mobile terminal of claim 9, wherein the controller is further configured to cause the display device and the display device of the another electronic device to display an identification element of the mobile terminal when the specific data are shared between the mobile terminal and at least one of the display device or the another electronic device.

14. The mobile terminal of claim 9, wherein the controller is further configured to cause the display device to display an identification element of at least one of the mobile terminal or the another electronic device in which the first application is being executed.

15. A mobile terminal capable of performing a content sharing function with an external display device, the mobile terminal comprising:

a radio communication unit configured to communicate wirelessly with the display device;

a sensing unit configured to sense a movement of the mobile terminal; and a controller configured to execute a second application or a predetermined and specific function in a state in which the content sharing function for a first application has been activated while executing the first application in background when the sensing unit senses a first type movement of the mobile terminal in a state in which the content sharing function with the display device has been activated on the first application being executed in foreground.

16. The mobile terminal of claim 15, wherein the controller is further configured to stop the executing of the second application or the predetermined and specific function in the mobile terminal when the sensing unit senses a second type movement of the mobile terminal.

17. The mobile terminal of claim 15, wherein the predetermined and specific function is related to the first application.

* * * * *